US008462439B2

(12) United States Patent
Oskotsky et al.

(10) Patent No.: US 8,462,439 B2
(45) Date of Patent: Jun. 11, 2013

(54) ATHERMAL APOCHROMATIC TELECENTRIC F-THETA LENS WITH LOW F-NUMBER

(75) Inventors: Mark L Oskotsky, Mamaroneck, NY (US); Michael J Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/214,968

(22) Filed: Aug. 22, 2011

(65) Prior Publication Data

US 2013/0050839 A1 Feb. 28, 2013

(51) Int. Cl.
*G02B 3/00* (2006.01)
*G02B 26/10* (2006.01)

(52) U.S. Cl.
USPC ........................................ 359/662; 359/206.1

(58) Field of Classification Search
USPC .............................................. 359/662, 206.1
See application file for complete search history.

(56) References Cited

U.S. PATENT DOCUMENTS

| 4,235,520 A | 11/1980 | Kimura |
| 4,333,714 A | 6/1982 | Kreitzer |
| 4,401,362 A | 8/1983 | Maeda |
| 4,436,383 A | 3/1984 | Maeda |
| 4,880,299 A * | 11/1989 | Hamada ........................ 359/662 |
| 5,835,280 A | 11/1998 | Griffith |
| 5,905,596 A | 5/1999 | Watanabe |
| 6,038,078 A | 3/2000 | Yamamoto |
| 6,388,817 B2 | 5/2002 | Nakai |
| 6,563,650 B2 | 5/2003 | Moskovich |
| 6,639,653 B2 | 10/2003 | Nagahama et al. |

* cited by examiner

*Primary Examiner* — Scott J Sugarman
(74) *Attorney, Agent, or Firm* — Maine Cernota & Rardin; Douglas Peter Burum

(57) ABSTRACT

A compact F-theta lens suitable for precise mapping and aerial photography has an F# of not more than 4.5 and a full field of view of 60° (high quality field over) 53°. The lens is near-telecentric to less than 6°, apochromatic from 450 nm to 650 nm, and athermal from −15° C. to +40° C. Embodiments have a focal plane diameter of 104 mm and are compatible for use with a CMOS 1.8 gigapixel multiple FPA. In some embodiments the focal length is 101 mm and the back working distance is more than 10 mm. In embodiments the lens includes three groups of optical elements, with an aperture located between the first and second groups. In some of these embodiments, the first group has at least three elements, while the second and third groups have four and three elements respectively, and the diameter of the first two groups, including housing, is less than 65 mm.

35 Claims, 34 Drawing Sheets

WAVEFRONT ANALYSIS

| FIELD | | | BEST INDIVIDUAL FOCUS | | | | BEST COMPOSITE FOCUS | | | |
|---|---|---|---|---|---|---|---|---|---|---|
| | FRACT | DEG | SHIFT (MM.) | FOCUS (MM.) | RMS (WAVES) | STREHL | SHIFT (MM.) | FOCUS (MM.) | RMS (WAVES) | STREHL |
| X | 0.00 | 0.00 | 0.000000 | -0.002538 | 0.0479 | 0.913 | 0.000000 | 0.002209 | 0.0506 | 0.904 |
| Y | 0.00 | 0.00 | 0.000000 | | 0.000000 | | | | | |
| X | 0.00 | 0.00 | 0.000000 | -0.001486 | 0.0498 | 0.907 | 0.000000 | 0.002209 | 0.0514 | 0.901 |
| Y | 0.12 | 4.00 | -0.000056 | | 0.000076 | | | | | |
| X | 0.00 | 0.00 | 0.000000 | 0.000573 | 0.0586 | 0.873 | 0.000000 | 0.002209 | 0.0589 | 0.872 |
| Y | 0.24 | 8.00 | 0.000050 | | 0.000160 | | | | | |
| X | 0.00 | 0.00 | 0.000000 | 0.000964 | 0.0652 | 0.845 | 0.000000 | 0.002209 | 0.0653 | 0.845 |
| Y | 0.37 | 12.00 | 0.000089 | | 0.000200 | | | | | |
| X | 0.00 | 0.00 | 0.000000 | 0.001248 | 0.0752 | 0.800 | 0.000000 | 0.002209 | 0.0753 | 0.800 |
| Y | 0.50 | 16.00 | 0.000022 | | 0.000115 | | | | | |
| X | 0.00 | 0.00 | 0.000000 | 0.006390 | 0.0893 | 0.730 | 0.000000 | 0.002209 | 0.0902 | 0.725 |
| Y | 0.63 | 20.00 | 0.000408 | | 0.000045 | | | | | |
| X | 0.00 | 0.00 | 0.000000 | 0.011406 | 0.0844 | 0.755 | 0.000000 | 0.002209 | 0.0887 | 0.733 |
| Y | 0.77 | 24.00 | 0.000529 | | 0.000026 | | | | | |
| X | 0.00 | 0.00 | 0.000000 | 0.004529 | 0.0849 | 0.752 | 0.000000 | 0.002209 | 0.0852 | 0.751 |
| Y | 0.86 | 26.50 | -0.000157 | | 0.000215 | | | | | |
| X | 0.00 | 0.00 | 0.000000 | 0.001589 | 0.1084 | 0.629 | 0.000000 | 0.002209 | 0.1084 | 0.629 |
| Y | 1.00 | 30.00 | 0.000012 | | 0.000004 | | | | | |

COMPOSITE RMS FOR
POSITION 1:  0.07564

Units of RMS are waves at 520.4 nm.

FIG. 2

```
         RDY        THI    RMD     GLA        CCY  THC  GLC
> OBJ:   INFINITY   INFINITY                   100  100
  1:     INFINITY   2.000000      SAPHIR_SPECIAL  100  100
  2:     INFINITY   7.083670                   100   0
  3:     -69.73669  6.000000      STIH53_OHARA    0  100
  4:     91.83604   5.121783                     0   0
  ASP:
  K :   0.000000  KC :   100
  CUF:  0.000000  CCF:   100
  A :0.888336E-06  B :0.126609E-09  C :-.953987E-13  D :-.311089E-16
  AC :   0    BC :   0    CC :   0    DC :   0

5:     99.10102   15.000000     SNBH8_OHARA     0  100
  6:     -60.34830  4.007460                      0   0
  7:     -70.19276  6.000000      NSF14_SCHOTT    0  100
  8:     118.28553  1.800537                      0   0
  9:     163.92773  9.229942      NSF66_SCHOTT    0   0
 10:     -84.90353  1.000000                      0   0
 11:     52.05007   8.000000      STIH53_OHARA    0  100
  ASP:
  K :   0.000000  KC :   100
  CUF:  0.000000  CCF:   100
  A :-.201857E-06  B :-.230667E-09  C :0.853315E-13  D :-.416317E-15
  AC :   0    BC :   0    CC :   0    DC :   0

12:     66.33178   7.250350                      0   0
STO:     INFINITY   1.282139                    100   0
 14:     191.95285  2.500000      SNBH8_OHARA     0   0
 15:     66.94363   7.223783                      0   0
 16:     62.94669   9.506909      SFSL5_OHARA     0   0
 17:     -71.86190  1.000000                      0   0
 18:     39.28291   12.500000     SFPL51_OHARA    0  100
 19:     -77.74315  1.041685                      0   0
 20:     -74.57551  3.500000      STIH53_OHARA    0  100
 21:     40.50406   39.420396                     0   0
 22:     -33.69127  4.000000      NKZFS5_SCHOTT   0  100
 23:     -162.83008 1.400503                      0   0
  ASP:
  K :   0.000000  KC :   100
  CUF:  0.000000  CCF:   100
  A :-.272289E-06  B :-.245614E-09  C :0.132238E-12  D :-.304149E-16
  AC :   0    BC :   0    CC :   0    DC :   0

24:     -626.28839 15.038492     NSF57_SCHOTT    0   0
 25:     -85.10407  1.000000                      0   0
 26:     430.07294  16.945724     NSF57_SCHOTT    0   0
  ASP:
  K :   0.000000  KC :   100
  CUF:  0.000000  CCF:   100
  A :0.437020E-06  B :-.109243E-09  C :0.174190E-13  D :-.173698E-17
  AC :   0    BC :   0    CC :   0    DC :   0

27:     -175.58528 0.100000                      0  100
 28:     INFINITY   4.000000      SAPHIR_SPECIAL 100  100
 29:     INFINITY   10.000000                   100   0
IMG:     INFINITY   0.000000                    100  100
```

Fig. 7

```
SPECIFICATION DATA
  FNO     4.50000
  DIM     MM
  WL      650.00    633.00    600.00    550.00    515.00    450.00
  REF     4
  WTW         25        1        50       100       100        50
  INI
  XAN      0.00000   0.00000   0.00000   0.00000   0.00000
           0.00000   0.00000   0.00000   0.00000
  YAN      0.00000   4.00000   8.00000  12.00000  16.00000
          20.00000  24.00000  26.50000  30.00000
  WTF     15.00000  10.00000   6.00000   6.00000  14.00000
          18.00000  14.00000   4.00000   8.00000
  VUX      0.00000   0.00087   0.00347   0.00780   0.01380
           0.02146   0.03073   0.03732   0.04755
  VLX      0.00000   0.00087   0.00347   0.00780   0.01380
           0.02146   0.03073   0.03732   0.04755
  VUY      0.00000  -0.00470  -0.00430   0.00130   0.01220
           0.02849   0.05025   0.06668   0.09338
  VLY      0.00000   0.00970   0.02428   0.04368   0.06785
           0.09678   0.13060   0.15432   0.19109
  POL     N

APERTURE DATA/EDGE DEFINITIONS
  CA
  CIR S0          *************
  CIR S1           29.447961
  CIR S2           28.859188
  CIR S3           28.210978
  CIR S4           27.637941
  CIR S5           29.034810
  CIR S6           29.128857
  CIR S7           26.430943
  CIR S8           26.053508
  CIR S9           26.182253
  CIR S10          26.144332
  CIR S11          22.414902
  CIR S12          19.931533
  CIR S13          14.060930
  CIR S14          16.864774
  CIR S15          16.536543
  CIR S16          20.428196
  CIR S17          20.878727
  CIR S18          21.697737
  CIR S19          21.203433
  CIR S20          20.744525
  CIR S21          19.914703
  CIR S22          28.094787
  CIR S23          38.362993
  CIR S24          44.689713
  CIR S25          46.204667
  CIR S26          54.081664
  CIR S27          54.350738
  CIR S28          53.367060
  CIR S29          53.113405
```

Fig. 7 (continued)

```
CIR S30         52.023560
```

REFRACTIVE INDICES
```
  GLASS CODE       650.00    633.00    600.00    550.00    515.00    450.00
  SAPHIR_SPECIAL   1.765214  1.765961  1.767571  1.770515  1.773066  1.779425
  STIH53_OHARA     1.837273  1.839528  1.844526  1.854151  1.862967  1.886939
  SFPL51_OHARA     1.495284  1.495706  1.496618  1.498303  1.499774  1.503469
  NSF14_SCHOTT     1.754203  1.756037  1.760092  1.767871  1.774966  1.794111
  NSF66_SCHOTT     1.911345  1.914103  1.920234  1.932121  1.943108  1.973496
  SFSL5_OHARA      1.485516  1.486004  1.487053  1.488975  1.490641  1.494800
  NKZFS5_SCHOTT    1.649608  1.650706  1.653108  1.657621  1.661642  1.672084
  NSF57_SCHOTT     1.837280  1.839533  1.844527  1.854148  1.862966  1.886966
  SNBH8_OHARA      1.714842  1.716206  1.719200  1.724867  1.729954  1.743322
```

No solves defined in system

No pickups defined in system

INFINITE CONJUGATES
```
  EFL     101.0000
  BFL      10.0208
  FFL     -17.4789
  FNO       4.5000
  IMG DIS  10.0000
  OAL     192.9534
  PARAXIAL IMAGE
    HT     58.3124
    ANG    30.0000
  ENTRANCE PUPIL
    DIA    22.4444
    THI    37.1819
  EXIT PUPIL
    DIA    41.4719
    THI  -176.6029
```

Fig. 7 (continued)

WAVEFRONT ANALYSIS

| FIELD | | BEST INDIVIDUAL FOCUS | | | | BEST COMPOSITE FOCUS | | | |
|---|---|---|---|---|---|---|---|---|---|
| FRACT | DEG | SHIFT (MM.) | FOCUS (MM.) | RMS (WAVES) | STREHL | SHIFT (MM.) | FOCUS (MM.) | RMS (WAVES) | STREHL |
| X 0.00 | 0.00 | 0.000000 | 0.008384 | 0.0472 | 0.916 | 0.000000 | 0.005804 | 0.0480 | 0.913 |
| Y 0.00 | 0.00 | 0.000000 | | 0.000000 | | | | | |
| X 0.00 | 0.00 | 0.000000 | 0.010260 | 0.0526 | 0.897 | 0.000000 | 0.005804 | 0.0548 | 0.888 |
| Y 0.12 | 4.00 | 0.000447 | | 0.000296 | | | | | |
| X 0.00 | 0.00 | 0.000000 | 0.011214 | 0.0659 | 0.843 | 0.000000 | 0.005804 | 0.0684 | 0.832 |
| Y 0.24 | 8.00 | 0.000772 | | 0.000431 | | | | | |
| X 0.00 | 0.00 | 0.000000 | 0.006224 | 0.0691 | 0.828 | 0.000000 | 0.005804 | 0.0692 | 0.828 |
| Y 0.37 | 12.00 | 0.000370 | | 0.000336 | | | | | |
| X 0.00 | 0.00 | 0.000000 | -0.001065 | 0.0704 | 0.822 | 0.000000 | 0.005804 | 0.0738 | 0.807 |
| Y 0.50 | 16.00 | -0.000431 | | 0.000181 | | | | | |
| X 0.00 | 0.00 | 0.000000 | 0.003596 | 0.0759 | 0.796 | 0.000000 | 0.005804 | 0.0763 | 0.795 |
| Y 0.63 | 20.00 | 0.000024 | | 0.000190 | | | | | |
| X 0.00 | 0.00 | 0.000000 | 0.018244 | 0.0692 | 0.828 | 0.000000 | 0.005804 | 0.0787 | 0.783 |
| Y 0.77 | 24.00 | 0.000540 | | 0.000085 | | | | | |
| X 0.00 | 0.00 | 0.000000 | 0.012550 | 0.0834 | 0.760 | 0.000000 | 0.005804 | 0.0857 | 0.748 |
| Y 0.86 | 26.50 | -0.000549 | | 0.000564 | | | | | |
| X 0.00 | 0.00 | 0.000000 | 0.005898 | 0.1201 | 0.566 | 0.000000 | 0.005804 | 0.1201 | 0.566 |
| Y 1.00 | 30.00 | -0.000337 | | 0.000331 | | | | | |

COMPOSITE RMS FOR
POSITION 1: 0.07852

FIG. 9

```
        RDY       THI    RMD      GLA        CCY THC  GLC
> OBJ:  INFINITY  INFINITY                   100 100
   1:   INFINITY  2.000000   SAPHIR_SPECIAL   100 100
   2:   INFINITY  4.354834                    100   0
   3:   -90.32614 6.000000   STIH53_OHARA       0 100
   4:   316.08013 4.392250                      0   0
   ASP:
   K :  0.000000  KC:   100
   CUF: 0.000000  CCF:  100
   A :0.156150E-05  B :0.286096E-09  C :0.128664E-12  D :0.422646E-15
   AC:   0    BC:   0    CC:   0    DC:   0

5:   -98.25183 8.000000   NSF66_SCHOTT       0 100
   6:   -65.24609 1.406286                      0   0
   ASP:
   K :  0.000000  KC:   100
   CUF: 0.000000  CCF:  100
   A :-.393369E-06  B :-.469878E-10  C :-.165728E-12  D :-.305823E-15
   AC:   0    BC:   0    CC:   0    DC:   0

7:   -56.19865 5.000000   NSF66_SCHOTT       0 100
   8:   -45.85850 1.206981                      0   0
   9:   -42.52463 6.000000   NSF14_SCHOTT       0 100
  10:   -116.82373 1.000000                     0   0
  11:   -712.87386 10.000000  SBAL42_OHARA      0 100
  12:   -58.97844 1.000000                      0   0
 STO:   INFINITY  1.000000                    100   0
  14:   77.78935  3.709188   SNPH2_OHARA        0   0
  15:   143.07893 22.772146                     0   0
  16:   176.26751 7.320980   SFSL5_OHARA        0   0
  17:   -108.11759 1.000000                     0   0
  18:   40.72919  14.000000  SFPL51_OHARA       0 100
  19:   -123.45985 1.000000                     0   0
  20:   -123.98804 2.600000  STIH53_OHARA       0   0
  21:   41.15913  41.366123                     0   0
  22:   -37.07906 2.600000   KZFSN5_SCHOTT      0   0
  23:   -121.88207 1.393163                     0   0
   ASP:
   K :  0.000000  KC:   100
   CUF: 0.000000  CCF:  100
   A :-.518938E-06  B :-.210314E-09  C :0.126901E-12  D :-.428090E-16
   AC:   0    BC:   0    CC:   0    DC:   0

24:   1252.93345 8.386112  SNPH2_OHARA        0   0
  25:   -206.24285 10.551582                    0   0
  26:   275.54595 16.914959  NSF66_SCHOTT       0   0
   ASP:
   K :  0.000000  KC:   100
   CUF: 0.000000  CCF:  100
   A :0.226489E-06  B :-.450919E-10  C :0.101971E-13  D :-.139077E-17
   AC:   0    BC:   0    CC:   0    DC:   0

27:   -203.35126 1.000000                     0   0
  28:   INFINITY  4.000000   SAPHIR_SPECIAL   100 100
  29:   INFINITY  8.000000                    100   0
```

Fig. 14

```
IMG:      INFINITY    0.000000              100   100
```

SPECIFICATION DATA
```
FNO    4.50000
DIM    MM
WL     650.00   633.00   600.00   550.00   515.00   450.00
REF    4
WTW    25       1        50       100      100      50
INI
XAN    0.00000   0.00000   0.00000   0.00000   0.00000
       0.00000   0.00000   0.00000   0.00000
YAN    0.00000   4.00000   8.00000   12.00000   16.00000
       20.00000  24.00000  26.50000  30.00000
WTF    1.00000   1.00000   6.00000   6.00000    14.00000
       14.00000  6.00000   4.00000   6.00000
VUX    0.00000   0.00081   0.00322   0.00721    0.01272
       0.01970   0.02805   0.03392   0.04290
VLX    0.00000   0.00081   0.00322   0.00721    0.01272
       0.01970   0.02805   0.03392   0.04290
VUY    0.00000  -0.00212   0.00057   0.00817    0.02074
       0.03829   0.06079   0.07730   0.10347
VLY    0.00000   0.00680   0.01815   0.03386    0.05376
       0.07762   0.10519   0.12417   0.15285
POL    N
```

APERTURE DATA/EDGE DEFINITIONS
```
CA
CIR S0          ***********
CIR S1          24.094127
CIR S2          23.505354
CIR S3          22.658567
CIR S4          21.311487
CIR S5          21.181793
CIR S6          21.449972
CIR S7          21.156985
CIR S8          21.381579
CIR S9          20.907935
CIR S10         21.230762
CIR S11         21.012243
CIR S12         20.742503
CIR S13         16.203452
CIR S14         19.318504
CIR S15         19.447306
CIR S16         24.853862
CIR S17         25.125466
CIR S18         25.642569
CIR S19         25.108361
CIR S20         24.536129
CIR S21         22.829540
CIR S22         29.732755
CIR S23         36.794094
CIR S24         44.302928
CIR S25         45.149555
CIR S26         54.681492
CIR S27         54.834084
CIR S28         53.539036
```

Fig. 14 (continued)

```
CIR S29        53.198795
CIR S30        52.000565

REFRACTIVE INDICES
  GLASS CODE       650.00    633.00    600.00    550.00    515.00    450.00
  SAPHIR_SPECIAL   1.765214  1.765961  1.767571  1.770515  1.773066  1.779425
  STIH53_OHARA     1.837273  1.839528  1.844526  1.854151  1.862967  1.886939
  SNPH2_OHARA      1.910208  1.913234  1.919970  1.933071  1.945231  1.979170
  SBAL42_OHARA     1.580376  1.581050  1.582513  1.585224  1.587599  1.593602
  SFPL51_OHARA     1.495284  1.495706  1.496618  1.498303  1.499774  1.503469
  NSF14_SCHOTT     1.754203  1.756037  1.760092  1.767871  1.774966  1.794111
  NSF66_SCHOTT     1.911345  1.914103  1.920234  1.932121  1.943108  1.973496
  SFSL5_OHARA      1.485516  1.486004  1.487053  1.488975  1.490641  1.494800
  KZFSN5_SCHOTT    1.649587  1.650691  1.653101  1.657624  1.661648  1.672092

No solves defined in system

No pickups defined in system

INFINITE CONJUGATES
  EFL      101.0000
  BFL        8.0065
  FFL      -25.9709
  FNO        4.5000
  IMG DIS    8.0000
  OAL      189.9746
  PARAXIAL IMAGE
  HT        58.3124
  ANG       30.0000
  ENTRANCE PUPIL
  DIA       22.4444
  THI       25.6843
  EXIT PUPIL
  DIA       43.8849
  THI     -189.4757
```

Fig. 14 (continued)

WAVEFRONT ANALYSIS

| FIELD | | BEST INDIVIDUAL FOCUS | | | | BEST COMPOSITE FOCUS | | | |
|---|---|---|---|---|---|---|---|---|---|
| FRACT | DEG | SHIFT (MM.) | FOCUS (MM.) | RMS (WAVES) | STREHL | SHIFT (MM.) | FOCUS (MM.) | RMS (WAVES) | STREHL |
| X 0.00 | 0.00 | 0.000000 | 0.003044 | 0.0587 | 0.873 | 0.000000 | 0.005044 | 0.0591 | 0.871 |
| Y 0.00 | 0.00 | 0.000000 | | | 0.000000 | | | | |
| X 0.00 | 0.00 | 0.000000 | 0.009692 | 0.0689 | 0.829 | 0.000000 | 0.005044 | 0.0705 | 0.822 |
| Y 0.46 | 15.00 | 0.000977 | | | 0.000609 | | | | |
| X 0.00 | 0.00 | 0.000000 | 0.007287 | 0.1061 | 0.641 | 0.000000 | 0.005044 | 0.1063 | 0.640 |
| Y 0.63 | 20.00 | 0.000187 | | | 0.000040 | | | | |
| X 0.00 | 0.00 | 0.000000 | 0.002500 | 0.0942 | 0.704 | 0.000000 | 0.005044 | 0.0945 | 0.703 |
| Y 0.86 | 26.50 | -0.000166 | | | 0.000171 | | | | |
| X 0.00 | 0.00 | 0.000000 | -0.000603 | 0.0717 | 0.816 | 0.000000 | 0.005044 | 0.0732 | 0.809 |
| Y 1.00 | 30.00 | 0.000065 | | | 0.000273 | | | | |

COMPOSITE RMS FOR
POSITION 1:  0.08204

FIG. 16

```
         RDY         THI      RMD      GLA          CCY  THC  GLC
> OBJ:   INFINITY    INFINITY                       100  100
  1:     INFINITY    2.000000          SAPHIR_SPECIAL  100  100
  2:     INFINITY    7.083670                        100    0
  3:     -69.73669   6.000000          STIH53_OHARA      0  100
  4:     91.83604    5.121783                          0    0
  ASP:
  K :  0.000000    KC :   100
  CUF: 0.000000    CCF:   100
  A :0.888336E-06  B :0.126609E-09  C :-.953987E-13  D :-.311089E-16
  AC :   0     BC :   0     CC :   0     DC :   0

5:     99.10102    15.000000         SNBH8_OHARA       0  100
  6:     -60.34830   4.007460                          0    0
  7:     -70.19276   6.000000          NSF14_SCHOTT      0  100
  8:     118.28553   1.800537                          0    0
  9:     163.92773   9.229942          NSF66_SCHOTT      0    0
 10:     -84.90353   1.000000                          0    0
 11:     52.05007    8.000000          STIH53_OHARA      0  100
  ASP:
  K :  0.000000    KC :   100
  CUF: 0.000000    CCF:   100
  A :-.201857E-06  B :-.230667E-09  C :0.853315E-13  D :-.416317E-15
  AC :   0     BC :   0     CC :   0     DC :   0

12:     66.33178    7.250350                          0    0
STO:     INFINITY    1.282139                        100    0
 14:     191.95285   2.500000          SNBH8_OHARA       0    0
 15:     66.94363    7.223783                          0    0
 16:     62.94669    9.506909          SFSL5_OHARA       0    0
 17:     -71.86190   1.000000                          0    0
 18:     39.28291    12.500000         SFPL51_OHARA      0  100
 19:     -77.74315   1.041685                          0    0
 20:     -74.57551   3.500000          STIH53_OHARA      0  100
 21:     40.50406    39.420396                         0    0
 22:     -33.69127   4.000000          NKZFS5_SCHOTT     0  100
 23:     -162.83008  1.400503                          0    0
  ASP:
  K :  0.000000    KC :   100
  CUF: 0.000000    CCF:   100
  A :-.272289E-06  B :-.245614E-09  C :0.132238E-12  D :-.304149E-16
  AC :   0     BC :   0     CC :   0     DC :   0

24:     -626.28839  15.038492         NSF57_SCHOTT      0    0
 25:     -85.10407   1.000000                          0    0
 26:     430.07294   16.945724         NSF57_SCHOTT      0    0
  ASP:
  K :  0.000000    KC :   100
  CUF: 0.000000    CCF:   100
  A :0.437020E-06  B :-.109243E-09  C :0.174190E-13  D :-.173698E-17
  AC :   0     BC :   0     CC :   0     DC :   0

27:     -175.58528  0.100000                          0  100
 28:     INFINITY    4.000000          SAPHIR_SPECIAL  100  100
 29:     INFINITY    10.000000                       100    0
IMG:     INFINITY    0.000000                        100  100
```

FIG. 21

```
SPECIFICATION DATA
  FNO    4.50000
  DIM       MM
  WL     650.00   633.00   600.00   550.00   515.00   450.00
  REF      4
  WTW      25       1       50      100      100       50
  INI
  XAN     0.00000   0.00000   0.00000   0.00000   0.00000
          0.00000   0.00000   0.00000   0.00000
  YAN     0.00000   4.00000   8.00000  12.00000  16.00000
         20.00000  24.00000  26.50000  30.00000
  WTF    15.00000  10.00000   6.00000   6.00000  14.00000
         18.00000  14.00000   4.00000   8.00000
  VUX     0.00000   0.00087   0.00347   0.00780   0.01380
          0.02146   0.03073   0.03732   0.04755
  VLX     0.00000   0.00087   0.00347   0.00780   0.01380
          0.02146   0.03073   0.03732   0.04755
  VUY     0.00000  -0.00470  -0.00430   0.00130   0.01220
          0.02849   0.05025   0.06668   0.09338
  VLY     0.00000   0.00970   0.02428   0.04368   0.06785
          0.09678   0.13060   0.15432   0.19109
  POL       N

APERTURE DATA/EDGE DEFINITIONS
  CA
  CIR S0            ************
  CIR S1            29.447961
  CIR S2            28.859188
  CIR S3            28.210978
  CIR S4            27.637941
  CIR S5            29.034810
  CIR S6            29.128857
  CIR S7            26.430943
  CIR S8            26.053508
  CIR S9            26.182253
  CIR S10           26.144332
  CIR S11           22.414902
  CIR S12           19.931533
  CIR S13           14.060930
  CIR S14           16.864774
  CIR S15           16.536543
  CIR S16           20.428196
  CIR S17           20.878727
  CIR S18           21.697737
  CIR S19           21.203433
  CIR S20           20.744525
  CIR S21           19.914703
  CIR S22           28.094787
  CIR S23           38.362993
  CIR S24           44.689713
  CIR S25           46.204667
  CIR S26           54.081664
  CIR S27           54.350738
  CIR S28           53.367060
  CIR S29           53.113405
```

Fig. 21 (continued)

```
CIR S30          52.023560

REFRACTIVE INDICES
  GLASS CODE      650.00    633.00    600.00    550.00    515.00    450.00
  SAPHIR_SPECIAL  1.765214  1.765961  1.767571  1.770515  1.773066  1.779425
  STIH53_OHARA    1.837273  1.839528  1.844526  1.854151  1.862967  1.886939
  SFPL51_OHARA    1.495284  1.495706  1.496618  1.498303  1.499774  1.503469
  NSF14_SCHOTT    1.754203  1.756037  1.760092  1.767871  1.774966  1.794111
  NSF66_SCHOTT    1.911345  1.914103  1.920234  1.932121  1.943108  1.973496
  SFSL5_OHARA     1.485516  1.486004  1.487053  1.488975  1.490641  1.494800
  NKZFS5_SCHOTT   1.649608  1.650706  1.653108  1.657621  1.661642  1.672084
  NSF57_SCHOTT    1.837280  1.839533  1.844527  1.854148  1.862966  1.886966
  SNBH8_OHARA     1.714842  1.716206  1.719200  1.724867  1.729954  1.743322

No solves defined in system

No pickups defined in system

INFINITE CONJUGATES
  EFL     101.0000
  BFL      10.0208
  FFL     -17.4789
  FNO       4.5000
  IMG DIS  10.0000
  OAL     192.9534
  PARAXIAL IMAGE
  HT       58.3124
  ANG      30.0000
  ENTRANCE PUPIL
  DIA      22.4444
  THI      37.1819
  EXIT PUPIL
  DIA      41.4719
  THI    -176.6029
```

Fig. 21 (continued)

ATHERMAL APOCHROMATIC TELECENTRIC F-THETA LENS WITH LOW F-NUMBER

FIELD OF THE INVENTION

The invention relates to optical lenses, and more particularly to F-theta lenses.

BACKGROUND OF THE INVENTION

Off axis light beam refraction through a focusing lens system will produce distorted images in a curved plane as opposed to a more desirable flat surface. A flat field scanning lens is a specialized lens system in which the focal plane is a flat surface.

For a typical flat field lens, in the absence of distortion, the beam of light enters the lens at an angle θ compared with the axis of the lens, the position of the spot focused by the lens will be dependent on the product of the focal length (F) of the lens and the tangent of the angle (θ). However, when the lens is designed with built-in barrel distortion, the position of the focused spot can then be made dependent on the product of F and θ, thereby simplifying positioning and image correction algorithms. Lenses designed in this way are called "F-theta" lenses. F-theta lenses are widely used in scanning applications such as laser marking, engraving, and cutting systems.

F-theta lenses are also used for surveillance and reconnaissance applications for precise mapping of an observed target. For these applications, the lens must meet several requirements which do not necessarily apply to other applications. It must provide acceptable images over a wide field of view and must have high resolution and high light sensitivity (i.e. have a low F#). In addition, the lens must be compact, and must provide acceptable images over a wide range of light frequencies, being at least achromatic (able to bring two frequencies to a common focal point) and preferably apochromatic (able to bring three frequencies to a common focal point). In addition, F-theta lenses used for surveillance and reconnaissance should be at least near-telecentric, so that it will produce images that are insensitive to the distance between the lens and the focal plane. If the lens is to be used over a range of temperatures, for example mounted to the exterior of an aircraft, then the lens must be athermal, i.e. invariant over a wide range of temperatures.

U.S. Pat. No. 4,401,362 (Aug. 30, 1983) discloses an F-theta lens for use in optical scanning devices. In such scanning devices the spot from a light beam should move at a constant velocity across the scanning surface. The '362 lens includes three elements and provides a field of view up to 58.2° and an F# of 50. However, the '362 lens would not be suitable for surveillance and reconnaissance applications, since it transmits a very limited amount of light because of its high F# and it has a low resolution. In addition, the '362 lens is suitable only for monochromatic applications, and cannot be used for applications requiring a wide spectrum.

Another example of a prior art F-theta lens is disclosed in U.S. Pat. No. 4,436,383 (Mar. 13, 1984). The '383 lens includes four components and can only be used for monochromatic applications. Its field of view is up to 60.8° and its F# is 19.7. Its resolution is low. For all of these reasons, the '383 lens is only suitable for laser systems applications, and not for surveillance and reconnaissance.

Yet another F-theta lens is disclosed in U.S. Pat. No. 5,835,280 (Nov. 10, 1998). The '280 lens is achromatic having the lateral color compensated electronically, but it is not apochromatic. Its field of view is 54° and its F# is not more than 20. In addition, the '280 lens is too large to be used for reconnaissance and surveillance applications.

Yet another F-theta lens is disclosed in U.S. Pat. No. 6,388,817 (May 14, 2002). The '817 lens is achromatic, has a field of view of 63°, and has an F# of 50. This lens is not apochromatic and its F# is very large, so it cannot be used in low F# reconnaissance and surveillance systems.

The contribution of the optical element to the axial color is the reciprocal of the Abbe number of lens material. The Abbe number $V_d$ is given by $$V_d = (n_d - 1)/(n_{F'} - n_{C'}) \quad (1)$$

where $N_d$ is the index of refraction of the glass at the wavelength of the helium line e (587.6 nm), $n_{F'}$ is the index of refraction at the blue cadmium line F' (479.99 nm), and $n_{C'}$ is the index of refraction at the red cadmium line C' (643.85 nm).

Accordingly, the smaller the value of $V_d$, the greater the chromatic dispersion of the glass.

The characterization of optical glass through refractive index and Abbe number alone is not sufficient for high quality optical systems. A more accurate description of the glass properties can be provided by including relative partial dispersions.

The relative partial dispersion Px,y for the wavelengths x and y is defined by the equation:

$$(n_x - n_y)/(n_F - n_c) \quad (2)$$

The following relationship will approximately apply to the majority of glasses, the so-called "normal glasses"

$$P_{xy} \approx a_{xy} + b_{xy} V_d \quad (3)$$

where $a_{xy}$ and $b_{xy}$ are specific constants for the given relative partial dispersion $P_{xy}$. So as to correct the secondary spectrum and provide an apochromatic lens (i.e. color correction for more than two wavelengths), glasses are required which do not conform to this rule. Therefore glass types having partial dispersions which deviate from Abbe's empirical rule are needed. The ordinate difference ΔP can be used to measure the deviation of the partial dispersion from Abbe's rule. The ordinate difference is given by the following generally valid equation:

$$P_{xy} = a_{xy} + b_{xy} \cdot v_d + \Delta P_{xy}. \quad (4)$$

The term $\Delta P_{xy}$ therefore quantitatively describes a dispersion behavior that deviates from that of "normal" glasses.

Optical materials expand with rising temperature. The Opto-thermal expansion coefficient β of an optical element is a property of the glass material, and it does not depend on the focal length or shape factor of the individual optics. For a single optical element:

$$\beta = \alpha + (dn/dT)/(n-1) \quad (5)$$

where
α=the thermal expansion coefficient of the glass
n=the refractive index of the glass at the current wave length
T=temperature The refractive index of an optical material is also affected by changes in glass temperature. This can be characterized by the temperature coefficient of the refractive index. The temperature coefficient of the refractive index is defined as dn/dt, and varies with wavelength and temperature.

There are two ways of expressing the temperature coefficient of refractive index. One is the absolute coefficient (dn/dt absolute) measured under vacuum, and the other is the relative coefficient (dn/dt relative) measured in ambient air (101.3 kPa {760 torr} dry air).

The absolute temperature coefficient of refractive index (dn/dt absolute) can be calculated using the following formula:

$$dn/dT_{absolute} = dn/dT_{relative} + n \cdot dn_{air}/dT \quad (6)$$

where dnair/dT is the temperature coefficient of refractive index of air listed in the table below.

TABLE I

| Temperature | $dn_{air}/dt$ ($10^{-6}$/° C.) | | | | | | |
|---|---|---|---|---|---|---|---|
| Range(° C.) | t | C' | He—Ne | D | e | F' | g |
| −40 to −20 | −1.34 | −1.35 | −1.36 | −1.36 | −1.36 | −1.37 | −1.38 |
| −20 to 0 | −1.15 | −1.16 | −1.16 | −1.16 | −1.16 | −1.17 | −1.17 |
| 0 to +20 | −0.99 | −1.00 | −1.00 | −1.00 | −1.00 | −1.01 | −1.01 |
| +20 to +40 | −0.86 | −0.87 | −0.87 | −0.87 | −0.87 | −0.88 | −0.88 |
| +40 to +60 | −0.76 | −0.77 | −0.77 | −0.77 | −0.77 | −0.77 | −0.78 |
| +60 to +80 | −0.67 | −0.68 | −0.68 | −0.68 | −0.68 | −0.69 | −0.69 |

The refractive index of optical glass change with the temperature is given by:

$$\frac{dn_{abs}(\lambda, T)}{dT} = \frac{n^2(\lambda, T_0)}{2 \cdot n(\lambda, T_0)} \cdot \left( D_0 + 2 \cdot D_1 \cdot \Delta T + 3 \cdot D_2 \cdot \Delta T^2 + \frac{E_0 + 2 \cdot E_1 \cdot \Delta T}{\lambda^2 - \lambda_{TK}^2} \right) \quad (7)$$

where
- $T_0$: Reference temperature (20° C.)
- T: Temperature (° C.)
- ΔT: Temperature difference versus $T_0$
- λ: Wavelength of the electromagnetic wave in a vacuum (μm)
- $D_0$, $D_1$, $D_2$, $E_0$, $E_1$ and $\lambda_{TK}$: constants depending on glass type.

The change in the refractive index with temperature usually has the largest impact on the lens performance and thermal focus range.

To make a lens apochromatic a special combination of glasses, Abbe numbers, and partial dispersions is needed. To make a lens athermal, a special combination of glass refractive indices that change with temperature has to be selected. The solution space is dependent on the configuration of the lens, the number of components, and the component shapes.

What is needed, therefore, is a compact F-theta lens having a low F# and a high resolution over a wide field of view, the lens being apochromatic, temperature stable, and near-telecentric over a wide range of light frequencies.

SUMMARY OF THE INVENTION

A compact F-theta lens has an F# of not more than 4.5 and a full field of view of 60° with a high quality performance field of view of over 53°. The lens is near-telecentric to less than 6°, apochromatic over a light frequency range of at least 450 nm-650 nm, and is athermal over a temperature range from −15° C. to +40° C.

Embodiments have a focal plane diameter of 104 mm and are compatible for use with a CMOS 1.8 gigapixel multiple FPA (focal plane array) having a 2×2 Bayer filter geometry and a pixel size of 2.2 μm×2.2 μm, wherein each CMOS image sensor pixel includes a series of dielectric layers above the photo detector, with a micro lens on top of each pixel to focus light onto the active area of the pixel floor, thereby minimizing both the amount of light lost and the amount of light incident on adjacent photodiodes. In various embodiments, secondary color is corrected so as to take full advantage of a high resolution FPA.

In some embodiments, the lens is athermal over the specified temperature range, so that there is no need for a special stage to move lens components or the focal plane to compensate for environmental temperature variations. In some embodiments the focal length is 101 mm and the back working distance is more than 10 mm.

In various embodiments, the lens comprises three groups of optical elements, and the aperture is located between the first and second groups (i.e. the two groups furthest from the FPA). In some of these embodiments, the first two groups can be contained within a housing having an outer diameter of 65 mm. In certain of these embodiments the first group includes at least three optical elements, the second group includes exactly four optical elements, and the third group includes exactly three optical elements.

In some of these embodiments, one of the first two groups of optical elements corrects the lens for spherical aberration and astigmatism across the field and corrects axial chromatism, spherochromatism, coma and astigmatism without causing distortion, while satisfying relationships required to achieve high resolution of the lens. The other of the first two groups corrects residual chromatic aberration, spherical aberration, coma and astigmatism across the field, while achieving athermalization of the lens through the desired spectrum. And the third optical group corrects field curvature, astigmatism and distortion.

The present invention is an F-theta lens that includes a first optical group including a plurality of optical elements, a second optical group, including a plurality of optical elements, an aperture located between the first and second optical groups, and a third optical group, including a plurality of optical elements. The F-number of the lens is not more than 4.5. The lens has a full field of view of at least 60°, with a quality performance field of 53°. The lens is telecentric to less than 6°, apochromatic over a range of at least 450 nm to 650 nm, and is functionally insensitive to temperature over a range of at least −15° C. to +40° C.

In embodiments, the second optical group includes exactly four optical elements, and the third optical group includes exactly three optical elements. In some of these embodiments the first optical group includes exactly five optical elements. In other of these embodiments, the first optical group includes exactly three optical elements, one of the optical elements being made of sapphire.

In various embodiments, the lens is athermal over the temperature range of at least −15° C. to +40° C.

In certain embodiments, the lens has a focal plane of at least 104 mm. In some of these embodiments the lens is compatible for use with a CMOS 1.8 gigapixel multiple FPA (focal plane array) having a 2×2 Bayer filter geometry and a pixel size of 2.2 μm×2.2 μm, wherein each CMOS image sensor pixel includes a series of dielectric layers above the photo detector, with a micro lens on top of each pixel to focus light onto the active area of the pixel floor, thereby minimizing both the amount of light lost and the amount of light incident on adjacent photodiodes.

In some embodiments the lens is secondary color corrected. In other embodiments the first two optical groups can be contained within a housing having an outer diameter of 65 mm. And in certain embodiments at least one surface of one of the optical elements in the first optical group is aspherical, and at least one surface of one of the optical elements in the third optical group is aspherical.

In various embodiments one of the first two optical groups corrects the lens for spherical aberration, axial chromatism, spherochromatism, coma, and astigmatism without causing distortion, the other of the first two optical groups corrects the lens for residual chromatic aberration, spherical aberration, coma, and astigmatism while achieving athermalization of the lens through the range of at least 450 nm to 650 nm, and the third optical group corrects field curvature, astigmatism and distortion.

In certain embodiments, all three optical groups have positive powers, whereby:

the first optical group includes five optical elements, having, in order, a negative optical power, a positive optical power, a negative optical power, a positive optical power and a positive optical power, the first optical group being arranged to converge light received from an object and to direct the converged light onto the second optical group;

the second optical group includes four optical elements, having, in order, a negative optical power, a positive optical power, a positive optical power and a negative optical power, the second optical group being arranged to further converge light received from the first optical group and to direct the converged light onto the third optical group;

the third optical group includes three optical elements having, in order, a negative optical power, a positive optical power and a positive optical power, the third optical group being arranged to focus the light from the second optical group onto the imaging surface; and the optical groups and optical elements satisfy the relationships described in paragraph [0087] below.

In some of these embodiments, the first optical element of the first optical group is a double concave lens, the second optical element of the first optical group is a double convex lens, the third optical element of the first optical group is a double concave lens, the fourth optical element of the first optical group is a double convex lens, and the fifth optical element of the first optical group is shaped as a meniscus whose concave surface faces toward the image.

In some of these embodiments the second surface of the first element of the first optical group is aspherical. In other of these embodiments the first surface of the fifth element of the first optical group is aspherical.

In other of these embodiments the first optical element of the second optical group is shaped as a meniscus whose concave surface faces toward the image, the second optical element is a double convex lens, the third optical element is a double convex lens, and the fourth optical element is a double concave lens.

In still other of these embodiments the first optical element of the third optical group is shaped as a negative meniscus lens whose concave surface faces toward the object, the second optical element of the third optical group is shaped as a positive meniscus whose concave surface faces toward the object, and the third optical element is a double convex lens.

In various of these embodiments the second surface of the first element of the third optical group is aspherical. And in other of these embodiments the first surface of the third element of the third optical group is aspherical.

In certain embodiments:

the first optical group has a negative optical power, and the second and third optical groups have positive optical powers, the first optical group includes five optical elements, having, in order a negative optical power, a positive optical power, a positive optical power, a negative optical power and a positive optical power, the first optical group being arranged to diverge light received from an object and to direct the diverged light onto the second optical group;

the second optical group includes four optical elements, having, in order, a positive optical power, a positive optical power, a positive optical power and a negative optical power, the second optical group being arranged to converge light received from the first optical group and to direct the converged light onto the third optical group;

the third optical group includes three optical elements having, in order, a negative optical power, a positive optical power and a positive optical power, the third optical group being arranged to focus light from the second optical group onto an imaging surface;

the aperture stop is positioned between the first and the second optical groups; and the optical groups and elements satisfy the relations give in paragraph below.

In some of these embodiments, the first optical element of the first optical group is a double concave lens, the second optical element of the first optical group is shaped as a meniscus whose concave surface faces toward the object, the third optical element of the first optical group is shaped as a meniscus whose concave surface faces toward the object, the fourth optical element of the first optical group is shaped as a meniscus whose concave surface faces toward the object, and the fifth optical element of the first optical group is shaped as a meniscus whose concave surface faces toward the object.

In some of these embodiments, the second surface of the first element of the first optical group is aspherical. In other of these embodiments, the second surface of the second element of the first optical group is aspherical.

In certain of these embodiments the first optical element of the second optical group is shaped as a positive meniscus whose concave surface faces toward the image, the second optical element is a double convex lens, the third optical element is in a double convex lens, and the fourth optical is a double concave lens.

In other of these embodiments the first optical element of the third optical group is shaped as a negative meniscus lens whose concave surface faces toward the object, the second optical element of the third optical group a double convex lens, and the third optical element of the third optical group is a double convex lens. In some of these embodiments the second surface of the first element of the third optical group is aspherical. In other of these embodiments the first surface of the third element of the third optical group is aspherical.

In yet other embodiments:

the first optical group has a negative optical power, and the second and third optical groups have positive optical powers;

the first optical group includes three optical elements, having, in order, a negative optical power, a positive optical power and a negative optical power, the first optical group being arranged to diverge light received from an object and to direct the diverged light onto the second optical group;

the second optical group includes four optical elements, having, in order, a negative optical power, a positive optical power, a positive optical power and a negative optical power, the second optical group being arranged to converge light received from the first optical group and to direct the converged light onto the third optical group;

the third optical group comprises three optical elements having, in order, a negative optical power, a positive optical power and a positive optical power, the third optical group being arranged to focus the light from the second optical group onto the imaging surface;

the aperture stop is positioned between the first and the second optical groups; and the optical groups and the optical elements satisfy the third embodiment relations described below.

In yet other embodiments, the first optical element of the first optical group is a double concave lens, the second optical element of the first optical group is a double convex lens, and the third optical element of the first optical group is shaped as a meniscus whose concave surface faces toward the object. In some of these embodiments the first surface of the first element of the first optical group is aspherical, and in other of these embodiments the second surface of the second element of the first optical group is aspherical.

In various of these embodiments the first optical element of the second optical group is shaped as a meniscus whose concave surface faces toward the image, the second optical element of the second optical group is a double convex lens, the third optical element of the second optical group is in a form of a double convex lens, and the fourth optical element of the second optical group is a double concave lens.

In other of these embodiments, the first optical element of the third optical group is shaped as a negative meniscus lens whose concave surface faces toward the object, the second optical element of the third optical group a double convex lens, and the third optical element of the third optical group is a double convex lens. In some of these embodiments the second surface of the first element of the third optical group is aspherical. And in some of these embodiments the first surface of the third element of the third optical group is aspherical.

And in certain of these embodiments the second optical element of the second optical group is made from sapphire.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 presents a wave front analysis of the embodiment of FIG. 1;

FIG. 7 is a listing of properties of optical elements for the embodiment of FIG. 1;

FIG. 9 presents a wave front analysis of the embodiment of FIG. 8;

FIG. 14 is a listing of properties of optical elements for the embodiment of FIG. 8;

FIG. 16 presents a wave front analysis of the embodiment of FIG. 15;

FIG. 21 is a listing of properties of optical elements for the embodiment of FIG. 15.

DETAILED DESCRIPTION

Figure 1:
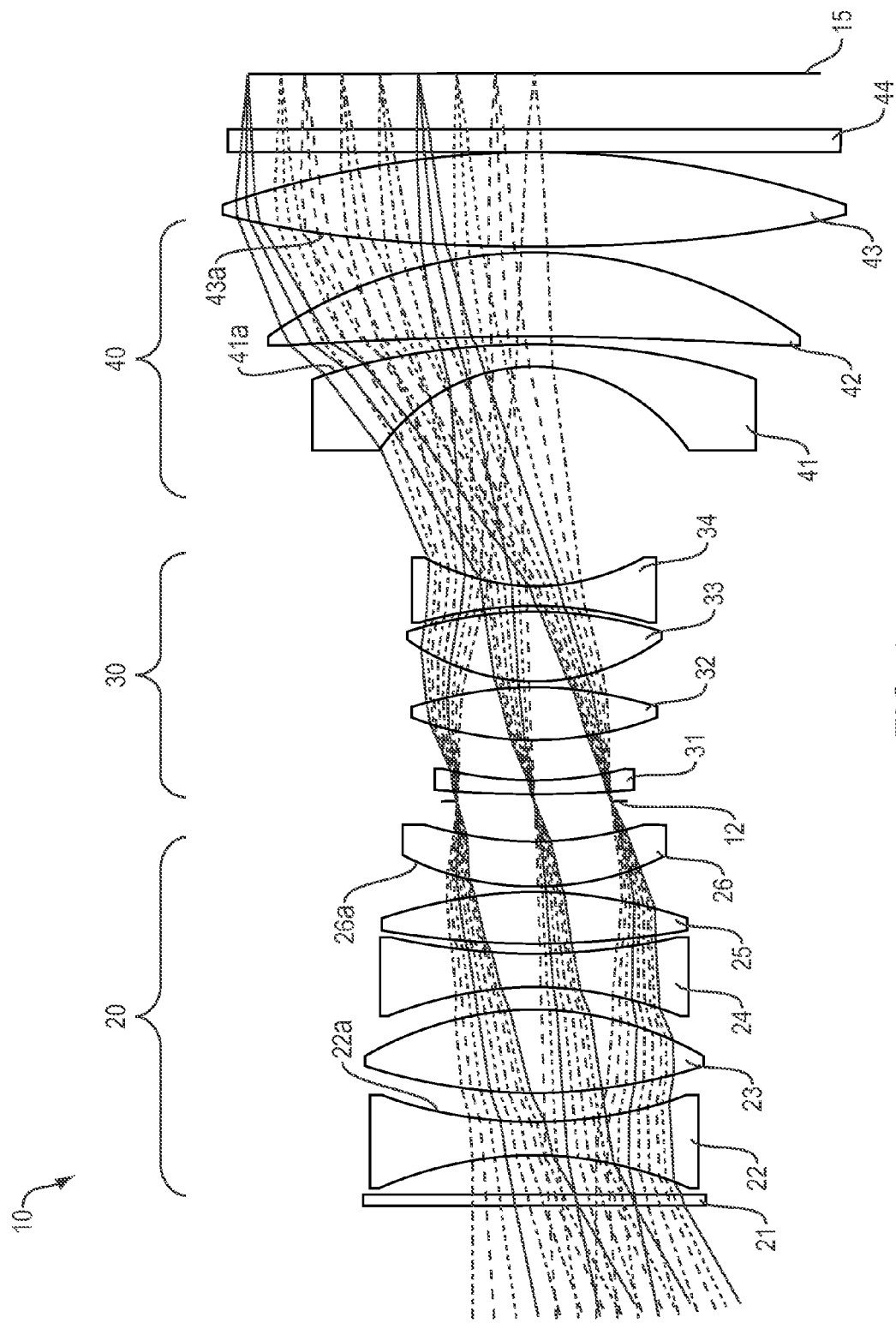
FIG. 1 is a cross sectional side view illustrating a first embodiment of the present invention.

FIG. 1 is a cross section of a first embodiment of the F-theta athermal lens 10 of the present invention. The lens includes a front window 21, a first optical group 20, a second optical group 30, a third optical group 40, and a back window 44 in order from the object to the image plane. An aperture stop 12 is located between the first and the second optical groups. An image of a target is formed on a focal plane array 60. In embodiments, the focal plane array incorporates CMOS with micro lenses, 2×2 Bayer filter geometry, and 1.8 Giga pixels. In other embodiments the image surface 60 incorporates CCD or a direct viewing screen.

The first optical group 20 has an overall positive optical power and is configured to receive light from the remote object and to direct the converged light onto the second optical group 30. The first optical group 20 includes five optical elements 22, 23, 24, 25 and 26, having, in order from the object to the image plane, a negative optical power, a positive optical power, a negative optical power, a positive optical power and a positive optical power. As can be seen in FIG. 1 the first optical element 22 of the first optical group 20 has a negative optical power and is a double concave lens. The second surface 22a of the element 22 is aspherical so as to correct oblique spherical aberration and to provide the low F# of the lens 10. The second optical element 23 has a positive optical power and is a double convex lens. The third optical element 24 has a negative optical power and is a double concave lens. The fourth optical element 25 has a positive optical power and is a double convex lens. The fifth optical element 26 has a positive optical power and is shaped as a meniscus whose concave surface faces toward the image. The first surface 26a of the fifth optical element is aspherical so as to correct spherical aberration and astigmatism across the field of view.

The mutual configuration of the five optical elements 22, 23, 24, 25 and 26 of the first optical group 20 provides correction of axial chromatism, spherochromatism, coma, and astigmatism without introducing a distortion, while satisfying relationships required among the optical elements to achieve high resolution of the lens 10.

The second optical group 30 has a positive overall optical power and is configured to further converge light from the first optical group 20 and to direct the converged light onto the third optical group 40. The second optical group includes four optical elements 31, 32, 33 and 34, having in order from the object to the image plane a negative optical power, a positive optical power, a positive optical power, and a negative optical power. The first optical element 31 of the second optical group 30 is shaped as a meniscus whose concave surface faces toward the image, the second optical element 32 is a double convex lens, the third optical element 33 is a double convex lens, and the fourth optical element 34 is a double concave lens.

The mutual configuration and choice of glasses of the elements in the second optical group 30 provides correction of residual chromatic aberration, spherical aberration, coma, and astigmatism across the field of view, while achieving athermalization of the lens 10 through the wavelength range of 450 nm-650 nm.

The third optical group 40 has a positive overall power and is configured to further converge the light from the second optical group 30 and to focus the light onto the focal plane array 15. The third optical group 40 includes three optical elements 41, 42 and 43, having, in order from the object to the image plane, a negative optical power, a positive optical power, and a positive optical power, respectively. The first optical element 41 of the third optical group 40 has a negative optical power and is shaped as a negative meniscus lens whose concave surface faces toward the object. The second surface 41a of the first element 41 is aspherical so as to correct residual astigmatism across the field of view. The second optical element 42 of the third optical group is shaped as a positive meniscus lens whose concave surface faces toward the object. The third optical element 43 is a double convex lens. The first surface 43a of the third optical element 43 is aspherical so as to correct residual coma and distortion shape across the field of view, and to provide telecentricity for the beam at the focal plane.

The mutual configuration of the third optical group elements provides correction of field curvature, astigmatism and distortion.

The mutual combination of glass refractive indices and Abbe numbers of the optical elements in the three optical groups 20, 30 and 40 provides apochromatic correction of the lens 10. The axial color and lateral color are corrected as well. The mutual combination changes of refractive indes with temperature provides athermalization of the lens 10 over the temperature range −15° C. to +40° C.

In the embodiment of FIG. 1 the optical groups 20, 30, 40 and their constituent optical elements satisfy the following relations:

$0.8 < F'_{10}/F'_{20} < 1.1$ $0.04 < F'_{10}/F'_{30} < 0.07$ $0.3 < F'_{10}/F'_{40} < 0.5$ $0.85 < n_{22}/n_{26} = n_{22}/n_{34} = n_{22}/n_{42} = n_{22}/n_{43} < 1.15$ $0.95 < n_{22}/n_{23} = n_{22}/n_{24} = n_{22}/n_{31} = < 1.25$ $0.80 < n_{22}/n_{25} < 1.1$ $1.05 < n_{22}/n_{32} = n_{22}/n_{33} = n_{22}/n_{41} < 1.35$ $0.8 < V_{22}/V_{24} = V_{22}/V_{25} = V_{22}/V_{26} = V_{22}/V_{34} = V_{22}/V_{42} = V_{22}/V_{43} < 1.2$ $1.45 < V_{22}/V_{23} = V_{22}/V_{31} = V_{22}/V_{41} < 0.8$ $0.25 < V_{22}/V_{32} < 0.45$ $0.2 < V_{22}/V_{33} < 0.4$ $0.0055 < P_{32}/V_{32} = P_{33}/V_{33} < < 0.0085$ $0.85 < dn/dT_{22}/dn/dT_{26} = dn/dT_{22}/dn/dT_{34} < 1.2$ $0.07 < dn/dT_{22}/dn/dT_{23} = dn/dT_{21}/dn/dT_{31} < 0.1$ $-0.5 < dn/dT_{22}/dn/dT_{24} < -0.3$ $0.2 < dn/dT_{22}/dn/dT_{25} < 0.35$ $-0.12 < dn/dT_{22}/dn/dT_{32} < -0.07$ $dn/dT_{22}/dn/dT_{42} = dn/dT_{22}/dn/dT_{43} < 0.5$ $-0.04 < dn/dT_{22}/dn/dT_{33'} < -0.02$ $0.035 < dn/dT_{22}/dn/dT_{41'} < 0.07$ where:

$F'_{10}$ is the focal length of the lens 10;

$F'_{20}$, $F'_{30}$ and $F'_{40}$ are the focal lengths of the first, the second and the third optical groups 20, 30 and 40;

$n_{22}$, $n_{23}$, $n_{24}$, $n_{25}$ and $n_{26}$ are the refractive indices for the optical elements 22, 23, 24, 25 and 26 of the first optical group 20;

$n_{31}$, $n_{32}$, $n_{33}$ and $n_{34}$ are the refractive indices for the optical elements 31, 32, 33, and 34 of the second optical group 30;

$n_{41}$, $n_{42}$ and $n_{43}$ are the refractive indices for the optical elements 41, 42 and 43 of the third optical group 40;

$V_{22}$, $V_{23}$, $V_{24}$, $V_{25}$ and $V_{26}$ are Abbe numbers for the optical elements 22, 23, 24, 25 and 26 of the first optical group 20;

$V_{31}$, $V_{32}$, $V_{33}$ and $V_{34}$ are Abbe numbers for the optical elements 31, 32, 33 and 34 of the second optical group 30;

$V_{41}$, $V_{42}$, and $V_{43}$ are Abbe numbers for the optical elements 41, 42, and 43 of the third optical group 40;

$P_{32}$ is the relative partial dispersion for F'-e spectrum for the second optical element 32 of the second optical group 30;

$P_{33}$ is the relative partial dispersion for F'-e spectrum for the third optical element 33 of the second optical group 30;

$dn/dT_{22}$ is the refractive index change with temperature for the first optical element 22 of the first optical group 20;

$dn/dT_{23}$ is the refractive index change with temperature for the second optical element 23 of the first optical group 20;

$dn/dT_{24}$ is the refractive index change with temperature for the third optical element 24 of the first optical group 20;

$dn/dT_{25}$ is the refractive index change with temperature for the second optical element 25 of the first optical group 20;

$dn/dT_{26}$ is the refractive index change with temperature for the second optical element 26 of the first optical group 20;

$dn/dT_{31}$ is the refractive index change with temperature for the first optical element 31 of the second optical group 30;

$dn/dT_{32}$ is the refractive index change with temperature for the second optical element 32 of the second optical group 30;

$dn/dT_{33}$ is the refractive index change with temperature for the third optical element 33 of the second optical group 30;

$dn/dT_{34}$ is the refractive index change with temperature for the fourth optical element 34 of the second optical group 30;

$dn/dT_{41}$ is the refractive index change with temperature for the first optical element 41 of the third optical group 40;

$dn/dT_{42}$ is the refractive index change with temperature for the second optical element 42 of the third optical group 40; and $dn/dT_{43}$ is the refractive index change with temperature for the third optical element 43 of the third optical group 40.

Selection of optical powers of optical groups and elements, selection of glass refractive indices, Abbe numbers and partial dispersions along with dn/dT values provides a high resolution imaging lens with chromatic and apochromatic correction while the defocus caused by changes in temperature is less than the depth of focus of the lens.

Figure 3A:
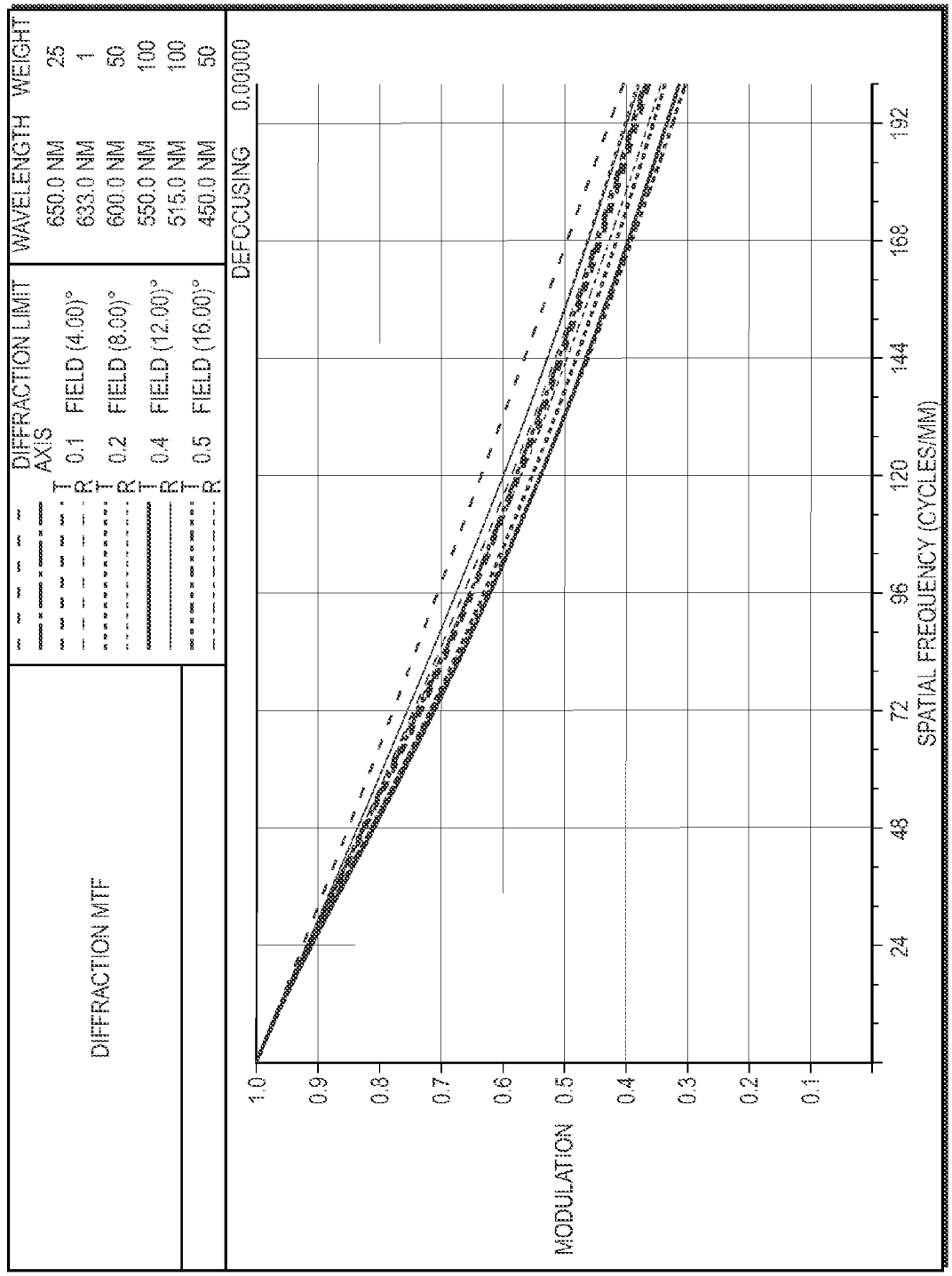
FIG. 3A is a graph presenting MTF data for the embodiment of FIG. 1.
Figure 3B:
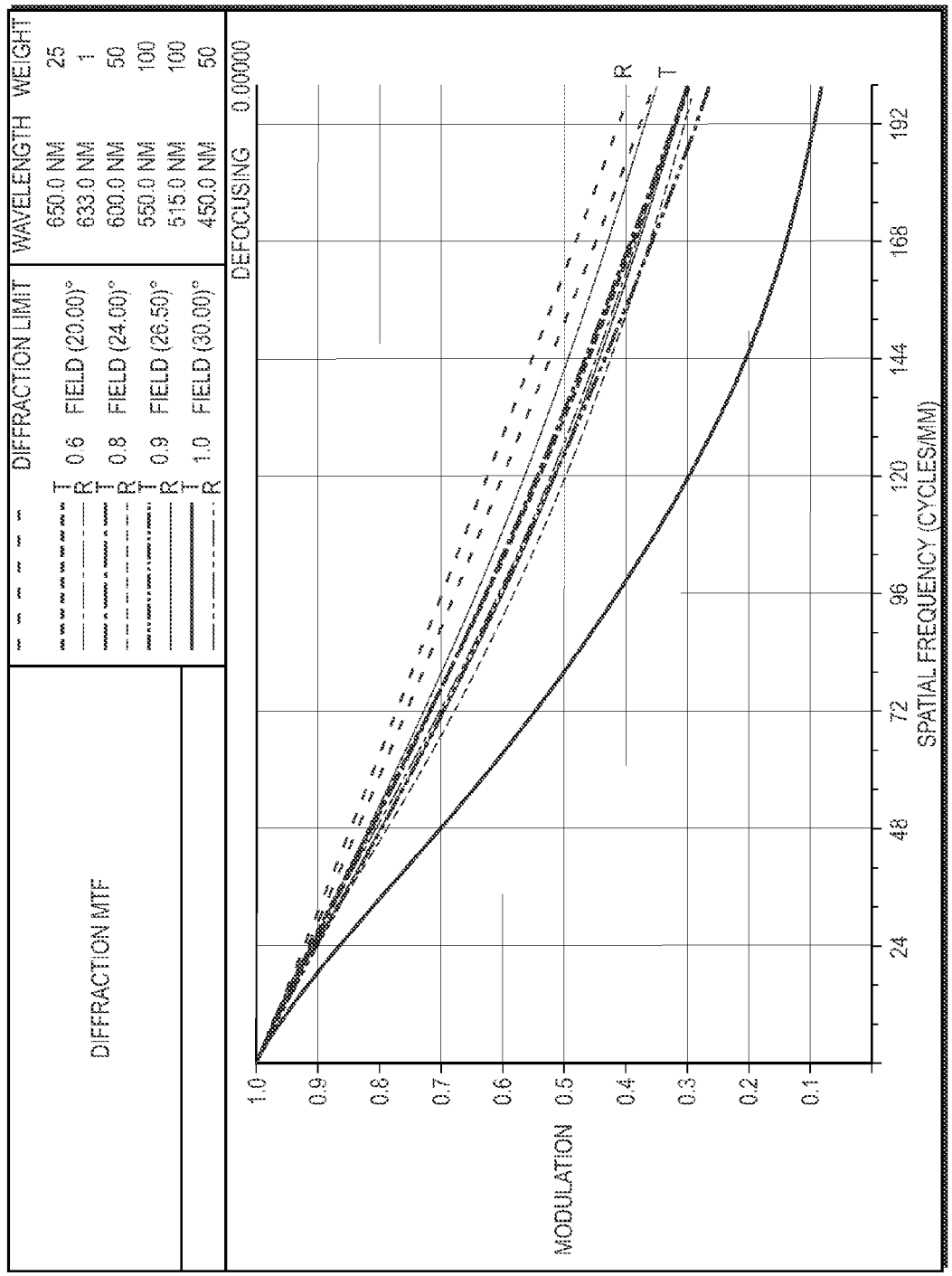
FIG. 3B is a graph presenting additional MTF data for the embodiment of FIG. 1.
Figure 4A:
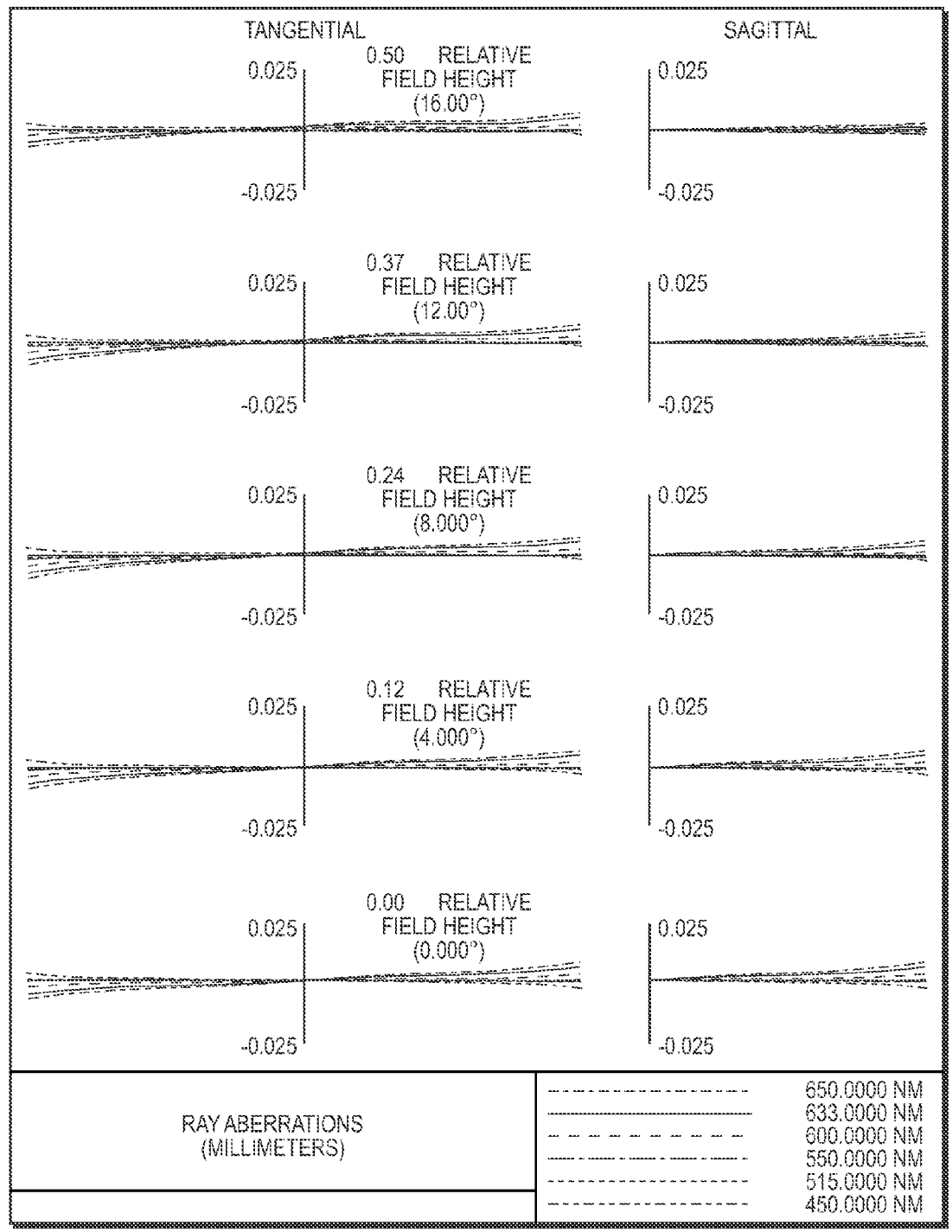
FIG. 4A includes a plurality of graphs presenting RIM RAY curves for the embodiment of FIG. 1.
Figure 4B:
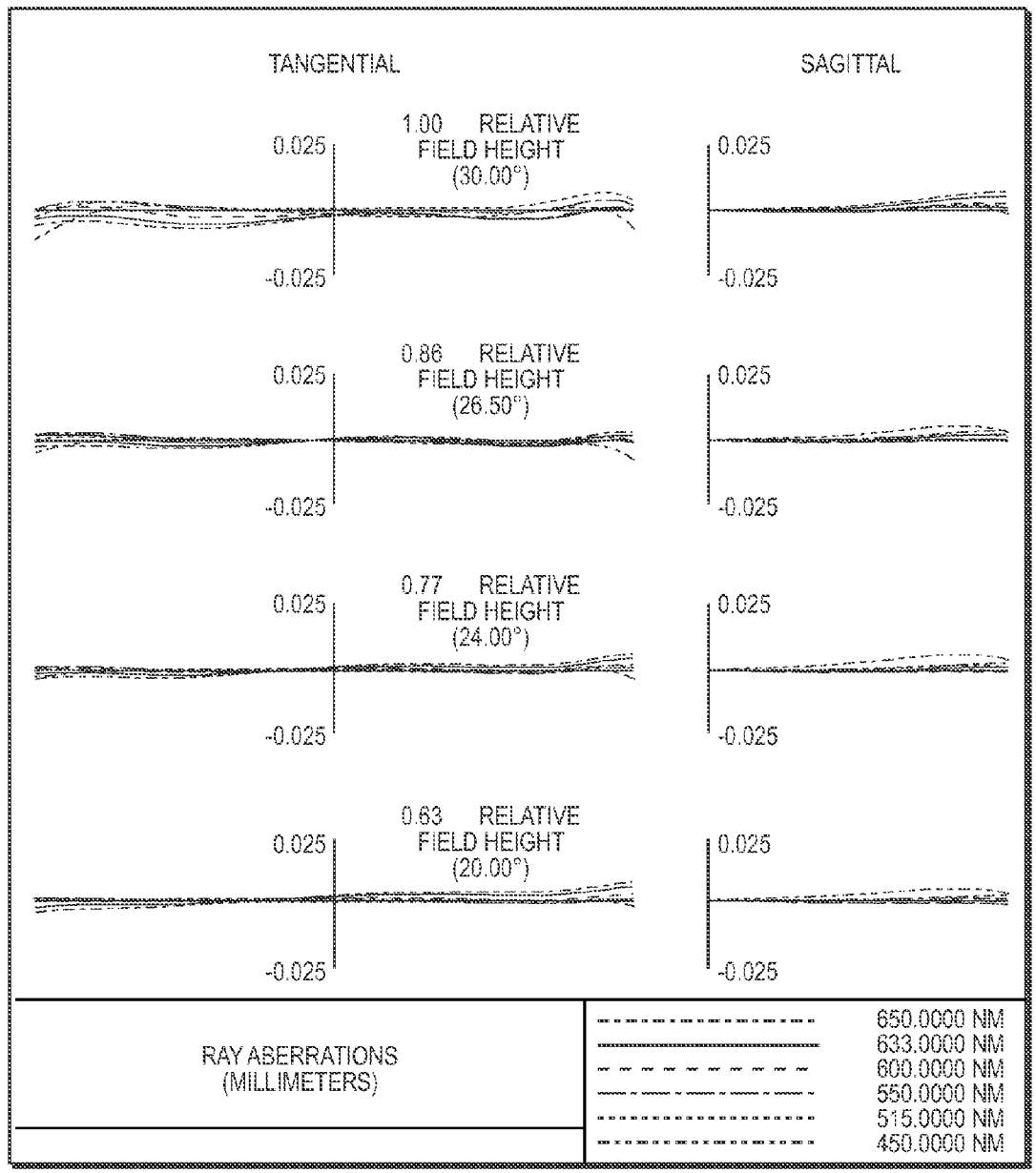
FIG. 4B includes additional graphs presenting RIM RAY curves for the embodiment of FIG. 1.
Figure 5A:
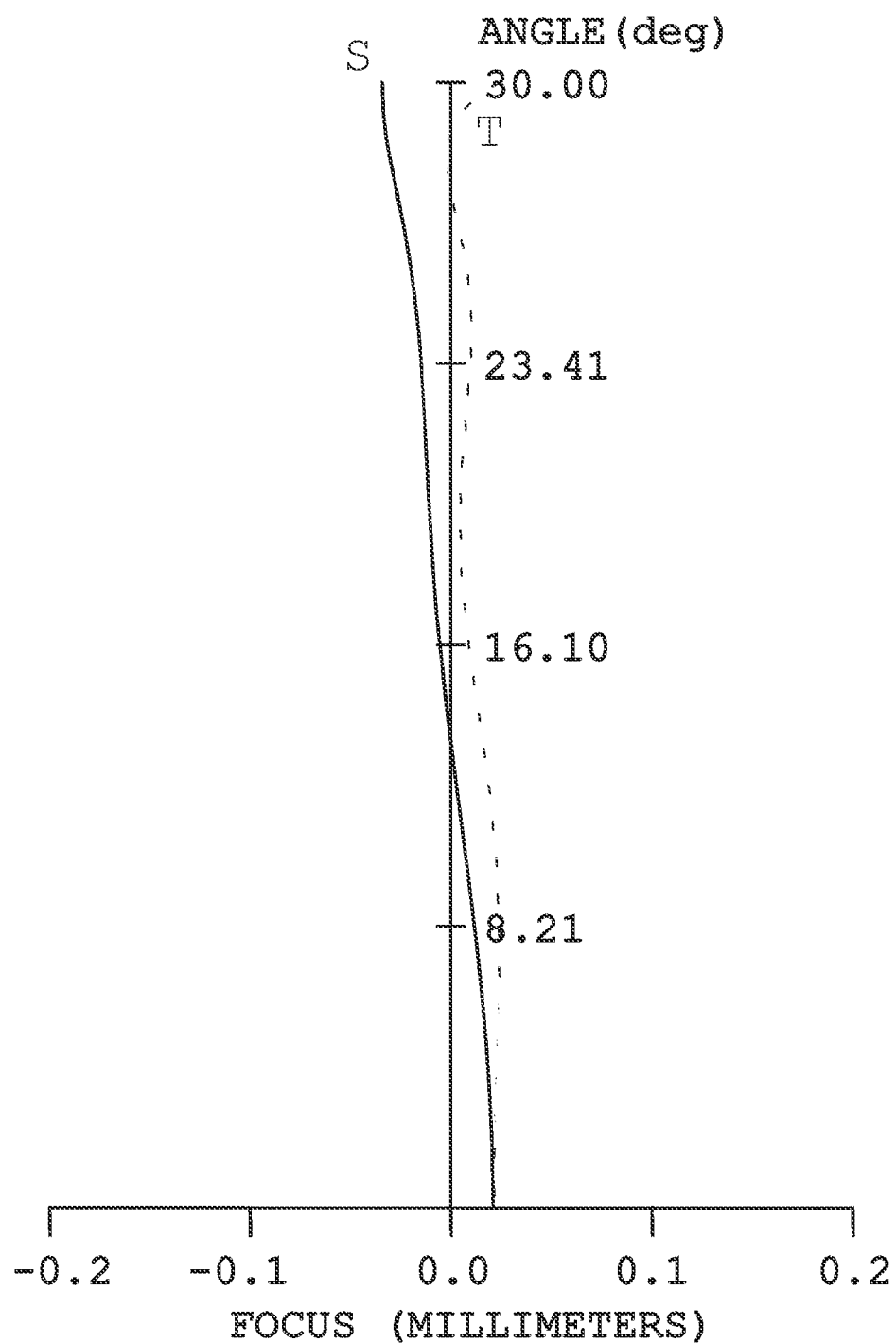
FIG. 5A presents a graph of field aberration data for the embodiment of FIG. 1.
Figure 5B:
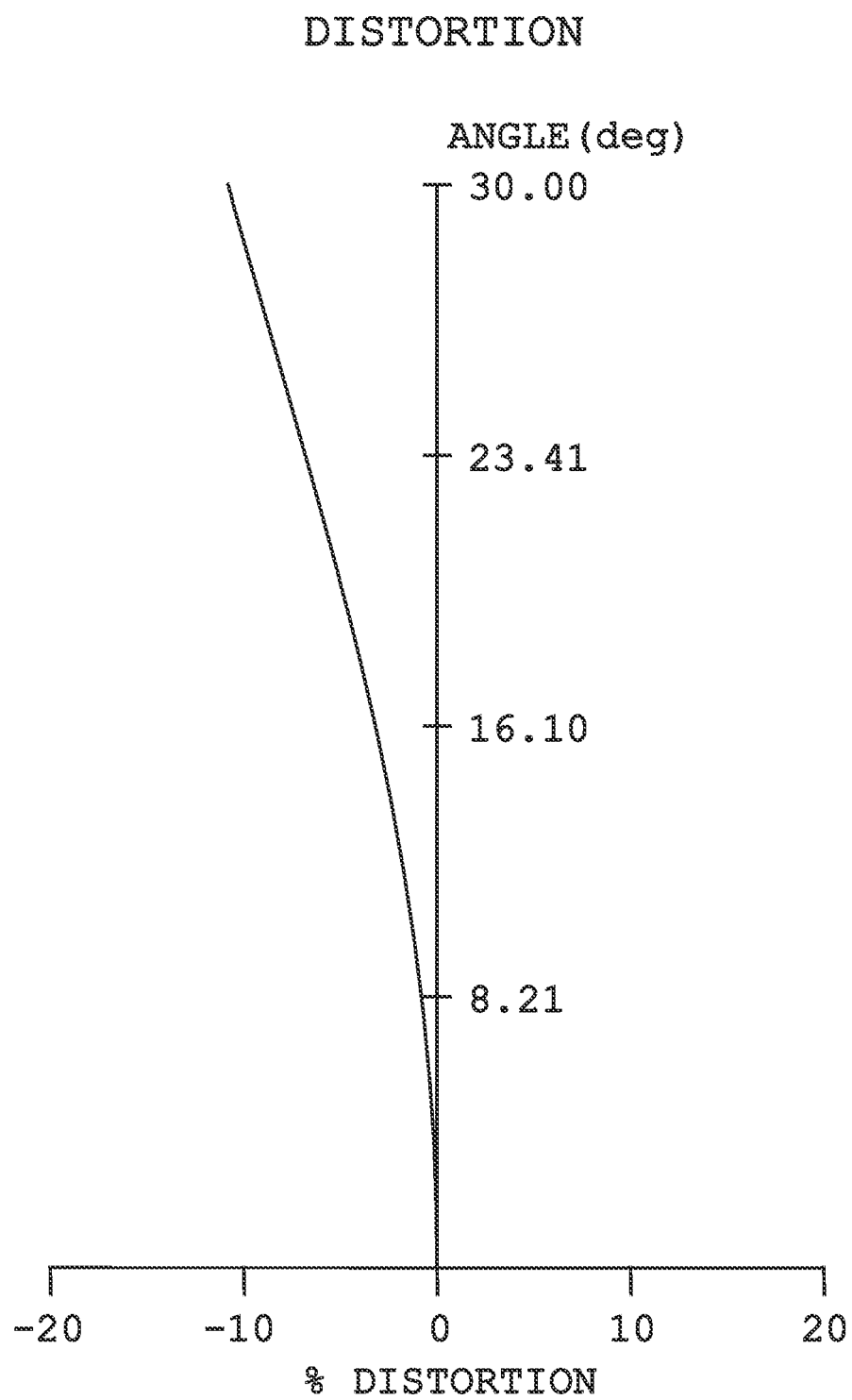
FIG. 5B presents a graph of distortion data for the embodiment of FIG. 1.
Figure 6:
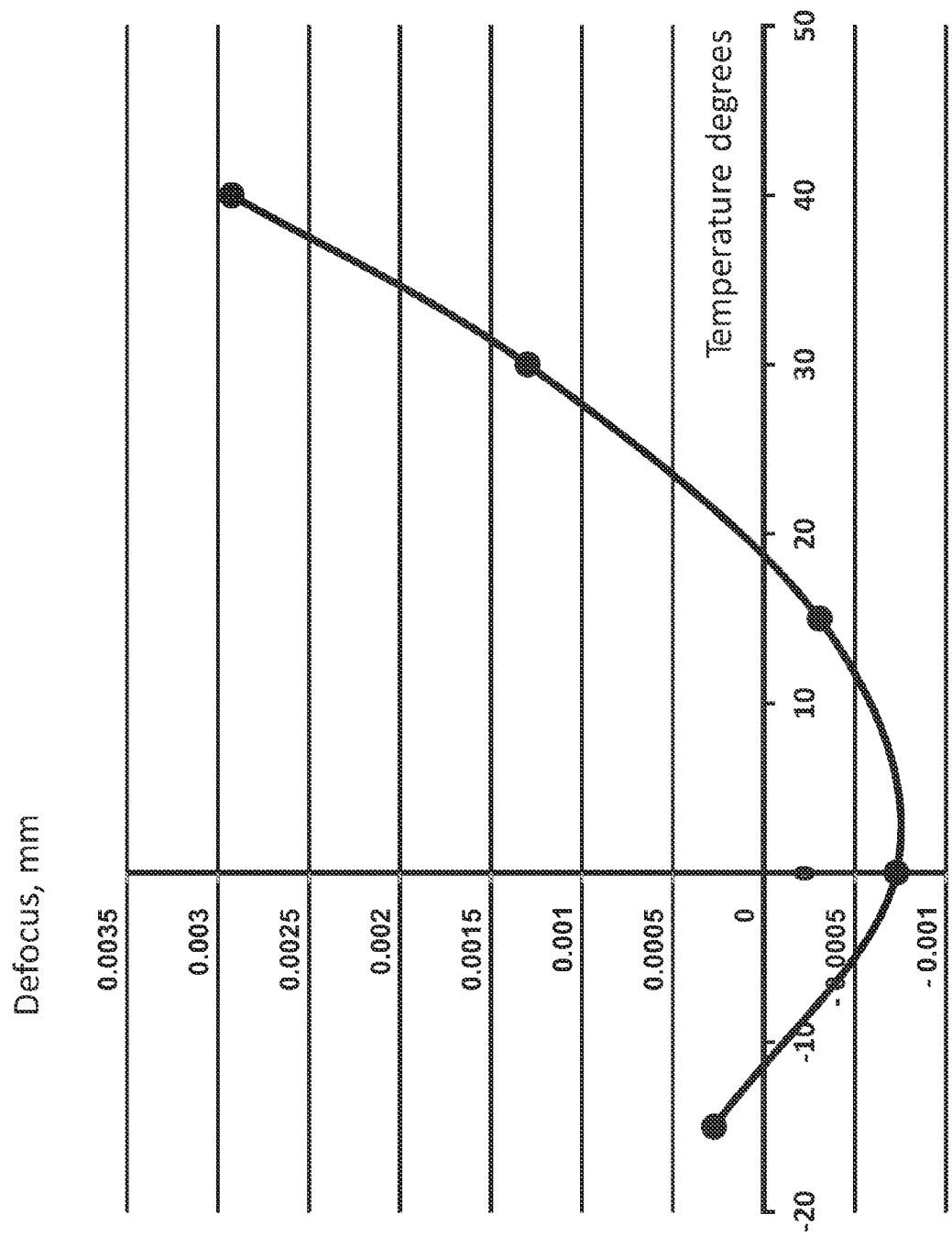
FIG. 6 is a graph presenting environmental analysis for the embodiment of FIG. 1.

The wave front for the embodiment of FIG. 1 is presented in FIG. 2, and MTF data for the first embodiment is presented in FIG. 3A and FIG. 3B respectively. The wave front is well corrected over the whole spectrum and polychromatic, and the MTF shows good resolution and contract over the entire field of view. The RIM RAY curves in FIG. 4A and FIG. 4B show the spherical aberration, coma, and chromatic and apochromatic correction over the wavelength range of 450 nm-650 nm. Astigmatism data is presented in FIG. 5A and distortion data is presented in FIG. 5B. The field is flat and the distortion corresponds to the F-theta law. Data regarding the change of the focus with temperature is presented in FIG. 6. The defocus over the temperature range of $-15°$ to $45°$ is 4 µm, which is much less than the depth of focus. The lack of telecentricity is less than $6°$ across the field of view. The prescription of the lens of FIG. 1 is presented in FIG. 7. The optical materials used in making the lens of FIG. 1 include optical glasses that are common and widely available commercially.

Figure 8:
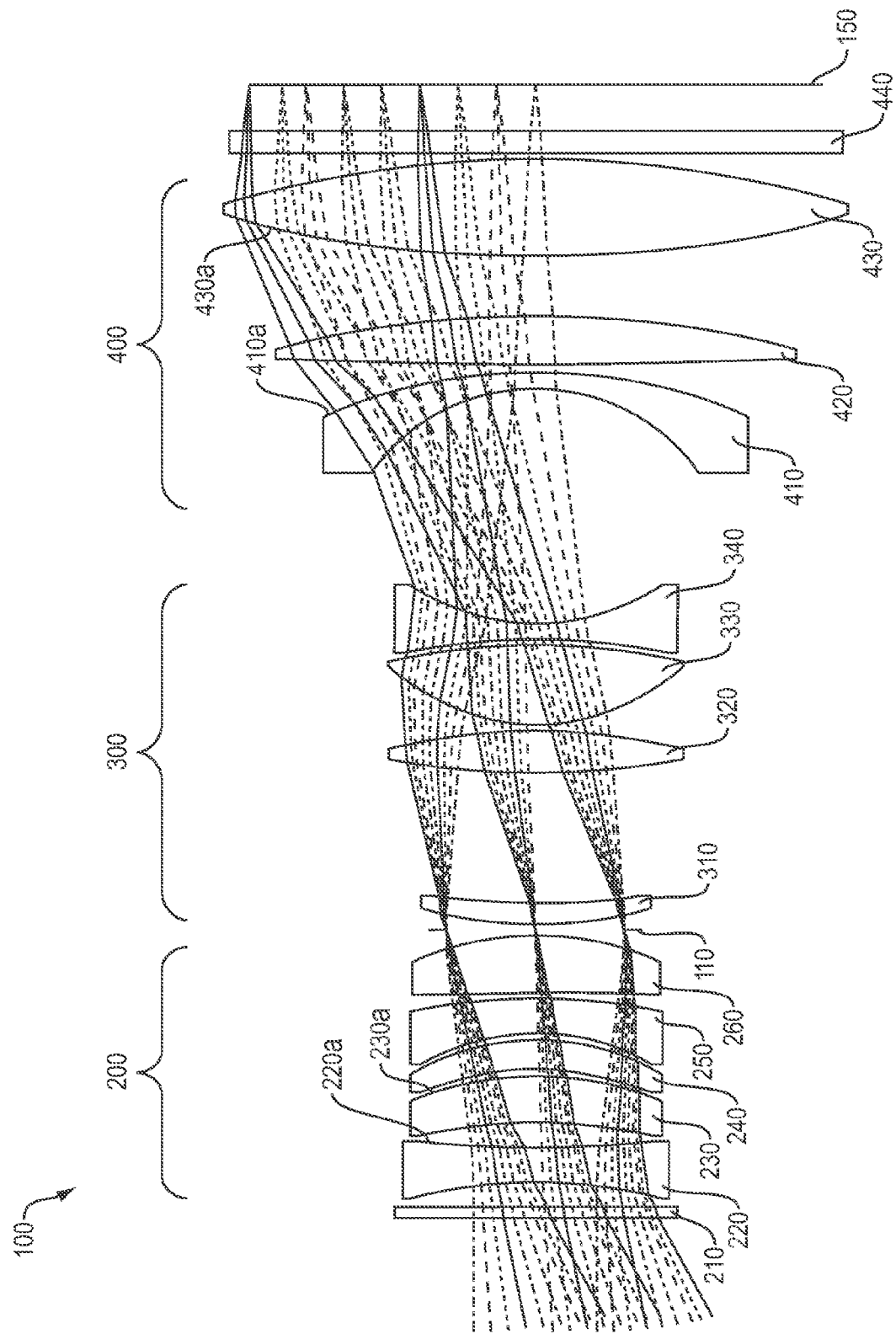
FIG. 8 is a cross sectional side view illustrating a second embodiment of the present invention.

FIG. 8 is a cross sectional illustration of a second embodiment of the F-theta athermal lens 100 of the present invention. The lens includes a front window 210, a first optical group 200, a second optical group 300, a third optical group 400 and a back window 440 in order from the object to the image plane 150. The aperture stop 110 is located between the first 200 and the third optical groups. An image of the target is formed on a focal plane array 150. In embodiments, the focal plane array 150 incorporates CMOS with micro lenses, 2×2 Bayer filter geometry, and 1.8 Giga pixels. In other embodiments, the image surface 150 may include CCD elements or a direct viewing screen.

In the embodiment of FIG. 8, the first optical group 200 has an overall negative optical power and is configured to receive light from a remote object and to direct the diverged light onto the second optical group 300. The first optical group 200 includes five optical elements 220, 230, 240, 250 and 260, having, in order from the object to the image plane, a negative optical power, a positive optical power, a positive optical power, a negative optical power and a positive optical power. As can be seen in FIG. 8, the first optical element 220 of the first optical group 200 has a negative optical power and is a double concave lens. The second surface 220a of the element 220 is aspherical so as to correct the spherical aberration and coma for the low F#4.5 of the lens 100. The second optical element 230 has a positive optical power and is shaped as a meniscus whose concave surface faces toward the object. The second surface of the second optical element 230 is aspherical for residual coma and astigmatism correction. The third optical element 240 has a positive optical power and is shaped as a meniscus whose concave surface faces toward the object. The fourth optical element 250 has a negative optical power and is shaped as a meniscus whose concave surface faces toward the object. The fifth optical element 260 has a positive optical power and is shaped as a meniscus whose concave surface faces toward the object. The mutual configuration of the five optical elements 220, 230, 240, 250 and 260 of the first optical group 200 and the choice of glasses combination provides correction of axial chromatism, spherical chromatic aberration, coma, and astigmatism, while satisfying relationships required among the optical elements to achieve high resolution of the lens 100.

The second optical group 300 has a positive overall optical power and is configured to converge light from the first optical group 200 and to direct the converged light onto the third optical group 400. The second optical group 300 includes four optical elements 310, 320, 330 and 340, having in order from the object to the image plane a positive optical power, a positive optical power, a positive optical power and a negative optical power. The first optical element 310 of the second optical group 300 is shaped as a positive meniscus whose concave surface faces toward the image, the second optical element 320 is a double convex lens, the third optical element 330 is a double convex lens, and the fourth optical element 340 is a double concave lens.

The mutual configuration and choice of glasses of the optical elements 310, 320, 330 and 340 in the second optical group 300 provides correction of residual chromatic aberration, residual spherical aberration, coma, and astigmatism across the field of view, while achieving athermalization of the lens 100 through the desired range of temperatures and through a wavelength range of 450 nm to 650 nm.

The third optical group 400 has a positive overall power and is configured to further converge the light from the second optical group 300 and to focus the converged light onto the focal plane array 150. The third optical group 400 includes three optical elements 410, 420 and 430, having, in order from the object to the image plane, a negative optical power, a positive optical power and a positive optical power respectively. The first optical element 410 of the third optical group 400 has a negative optical power and is shaped as a negative meniscus lens whose concave surface faces toward the object. The second surface 410a of the first element 410 is aspherical so as to correct a residual saggital astigmatism across the field of view. The second 420 and third 430 optical elements of the third optical group 400 are both double convex lenses. The first surface 430a of the third optical element 430 is aspherical so as to correct residual coma and distortion shape across the field of view, and to achieve telecentricity for the beam at the image space.

The mutual configuration of the third optical group elements provides correction of field curvature, astigmatism and distortion. The mutual combination of glass refractive indices and Abbe numbers of the optical elements in the optical groups 20, 30 and 40 provides apochromatic correction of the lens 100. The axial color and lateral color are also corrected. The mutual combination of changes of refractive index with temperature provides athermalization of the lens 100 over the temperature range from $-15°$ C. to $40°$ C.

The embodiment of FIG. 8 satisfies the following relations among the optical groups 200, 300, 400 and their constituent optical elements:

$$-0.08 < F'_{100}/F'_{200} < -0.06$$

$$0.8 < F'_{100}/F'_{300} < 0.9$$

$$0.2 < F'_{100}/F'_{400} < 0.4$$

$$0.8 < n_{220}/n_{230} = n_{220}/n_{240} = n_{220}/n_{310} = n_{220}/n_{340} = n_{220}/n_{420} = n_{220}/n_{430} < 1.1$$

$$1.1 < n_{220}/n_{260} = n_{220}/n_{320} = n_{220}/n_{330} = n_{220}/n_{410} = < 1.35$$

$$0.9 < n_{220}/n_{250} < 1.2$$

$0.9 < V_{220}/V_{230} = V_{220}/V_{240} = V_{220}/V_{310} = V_{220}/V_{340} = V_{220}/V_{420} = V_{220}/V_{430} < 1.3$ $0.8 < V_{220}/V_{250} < 1.1$ $0.3 < V_{220}/V_{260} = V_{220}/V_{320} < 0.5$ $0.2 < V_{220}/V_{330} < 0.4$ $0.5 < V_{220}/V_{410} < 0.7$ $0.0055 < P_{320}/V_{320} = P_{330}/V_{330} << 0.0085$ $0.2 < dn/dT_{220}/dn/dT_{230} = dn/dT_{220}/dn/dT_{240} = dn/dT_{220}/dn/dT_{430} < 0.4$ $-0.55 < dn/dT_{220}/dn/dT_{250} < -0.35$ $0.08 < dn/dT_{220}/dn/dT_{260} < 0.1$ $0.1 < dn/dT_{220}/dn/dT_{310} = dn/dT_{220}/dn/dT_{420} < 0.3$ $-0.3 < dn/dT_{220}/dn/dT_{320} < -0.08$ $-0.04 < dn/dT_{220}/dn/dT_{330} < -0.02$ $0.9 < dn/dT_{220}/dn/dT_{340} < 1.1$ $0.35 < dn/dT_{220}/dn/dT_{410} < 0.55$ where:

$F'_{100}$ is the focal length of the lens 100;

$F'_{200}$, $F'_{300}$ and $F'_{400}$ are the focal lengths of the first, the second and the third optical groups 200, 300 and 400;

$n_{220}$, $n_{230}$, $n_{240}$, $n_{250}$ and $n_{260}$ are the refractive indices for the optical elements 220, 230, 240, 250 and 206 of the first optical group 200;

$n_{310}$, $n_{320}$, $n_{330}$ and $n_{340}$ are the refractive indices for the optical elements 310, 320, 330 and 340 of the second optical group 300;

$n_{410}$, $n_{420}$ and $n_{430}$ are the refractive indices for the optical elements 410, 420 and 430 of the third optical group 400;

$V_{220}$, $V_{230}$, $V_{240}$, $V_{250}$ and $V_{260}$ are the Abbe numbers for the optical elements 220, 230, 240, 250 and 260 of the first optical group 200;

$V_{310}$, $V_{320}$, $V_{330}$ and $V_{340}$ are the Abbe numbers for the optical elements 310, 320, 330 and 340 of the second optical group 300;

$V_{410}$, $V_{420}$, and $V_{430}$ are the Abbe numbers for the optical elements 410, 420, and 430 of the third optical group 400;

$P_{320}$ is the relative partial dispersion for F'-e spectrum for the second optical element 320 of the second optical group 300;

$P_{330}$ is the relative partial dispersion for F'-e spectrum for the third optical element 330 of the second optical group 300;

$dn/dT_{220}$ is the refractive index change with temperature for the first optical element 220 of the first optical group 200;

$dn/dT_{230}$ is the refractive index change with temperature for the second optical element 230 of the first optical group 200;

$dn/dT_{240}$ is the refractive index change with temperature for the third optical element 240 of the first optical group 200;

$dn/dT_{250}$ is the refractive index change with temperature for the second optical element 250 of the first optical group 200;

$dn/dT_{260}$ is the refractive index change with temperature for the second optical element 260 of the first optical group 200;

$dn/dT_{310}$ is the refractive index change with temperature for the first optical element 310 of the second optical group 300;

$dn/dT_{320}$ is the refractive index change with temperature for the second optical element 320 of the second optical group 300;

$dn/dT_{330}$ is the refractive index change with temperature for the third optical element 330 of the second optical group 300;

$dn/dT_{340}$ is the refractive index change with temperature for the fourth optical element 340 of the second optical group 300;

$dn/dT_{410}$ is the refractive index change with temperature for the first optical element 410 of the third optical group 400;

$dn/dT_{420}$ is the refractive index change with temperature for the second optical element 420 of the third optical group 400; and $dn/dT_{430}$ is the refractive index change with temperature for the third optical element 430 of the third optical group 400.

The selection of optical powers of the optical groups, the selection of glass refractive indices, Abbe numbers, and partial dispersions, and the selection of dn/dT values provides a high resolution imaging lens with chromatic and apochromatic correction while the defocus caused by changes in temperature is less than the depth of focus of the lens.

Figure 10A:
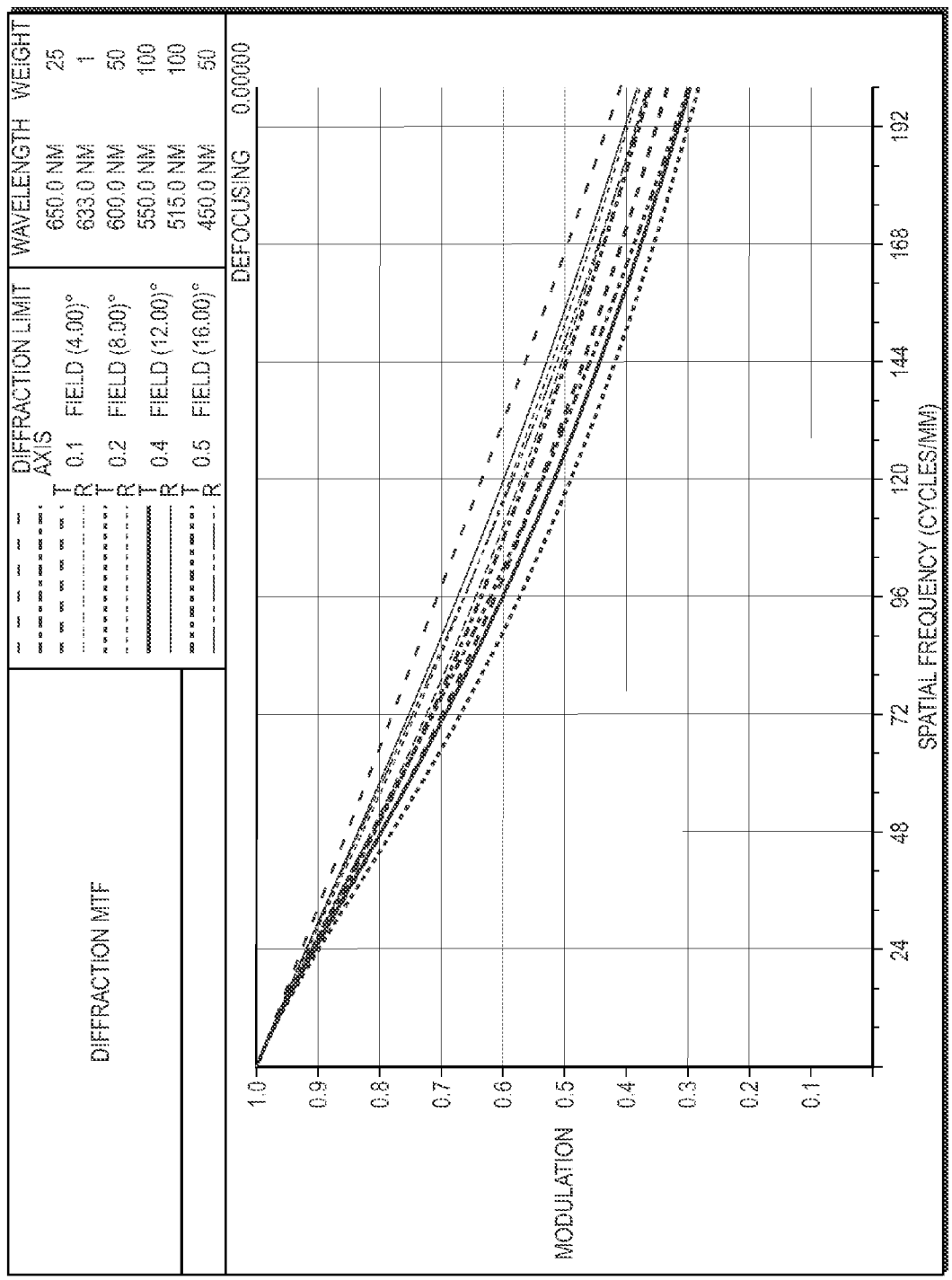
FIG. 10A is a graph presenting MTF data for the embodiment of FIG. 8.
Figure 10B:
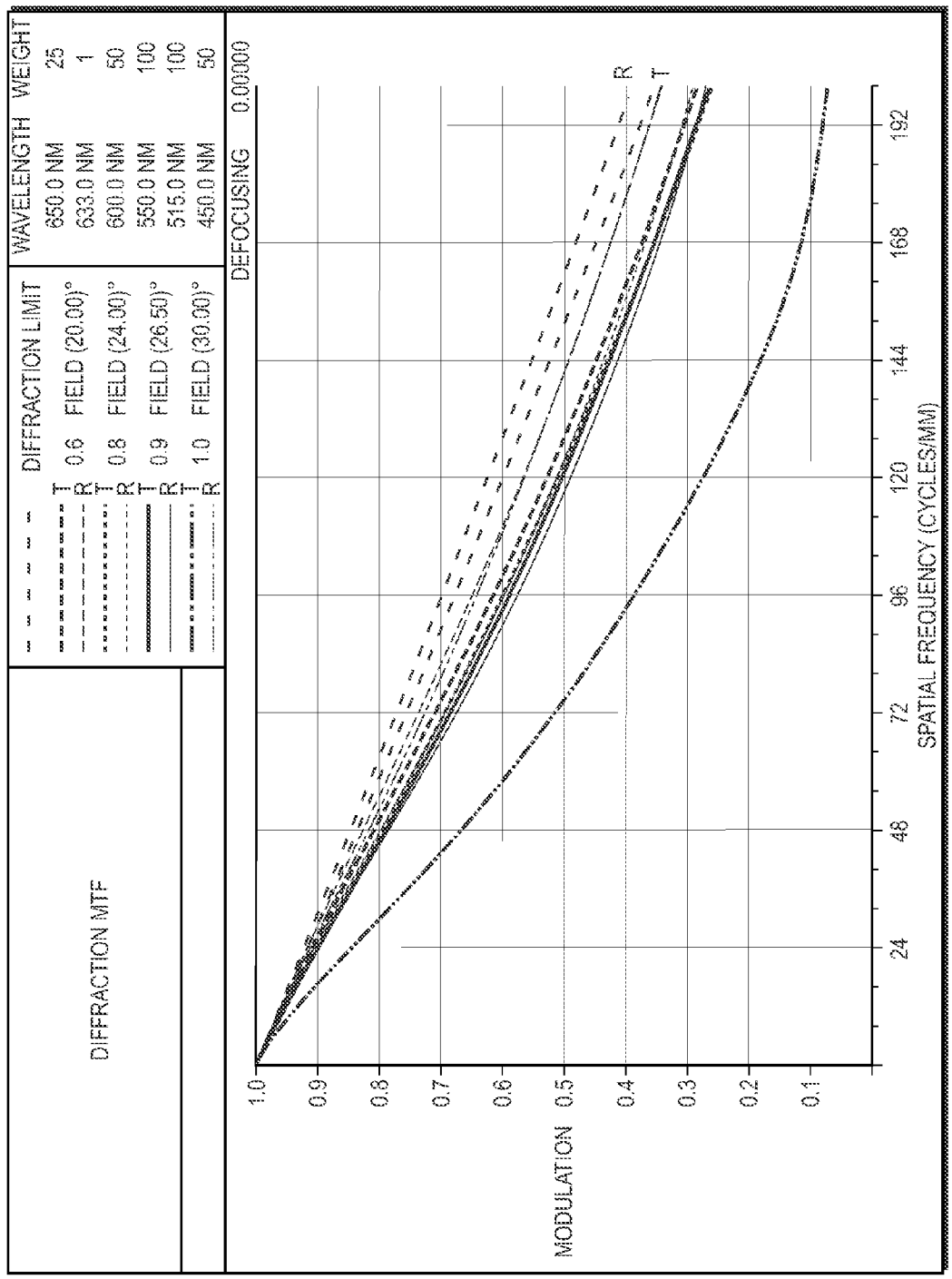
FIG. 10B is a graph presenting additional MTF data for the embodiment of FIG. 8.
Figure 11A:
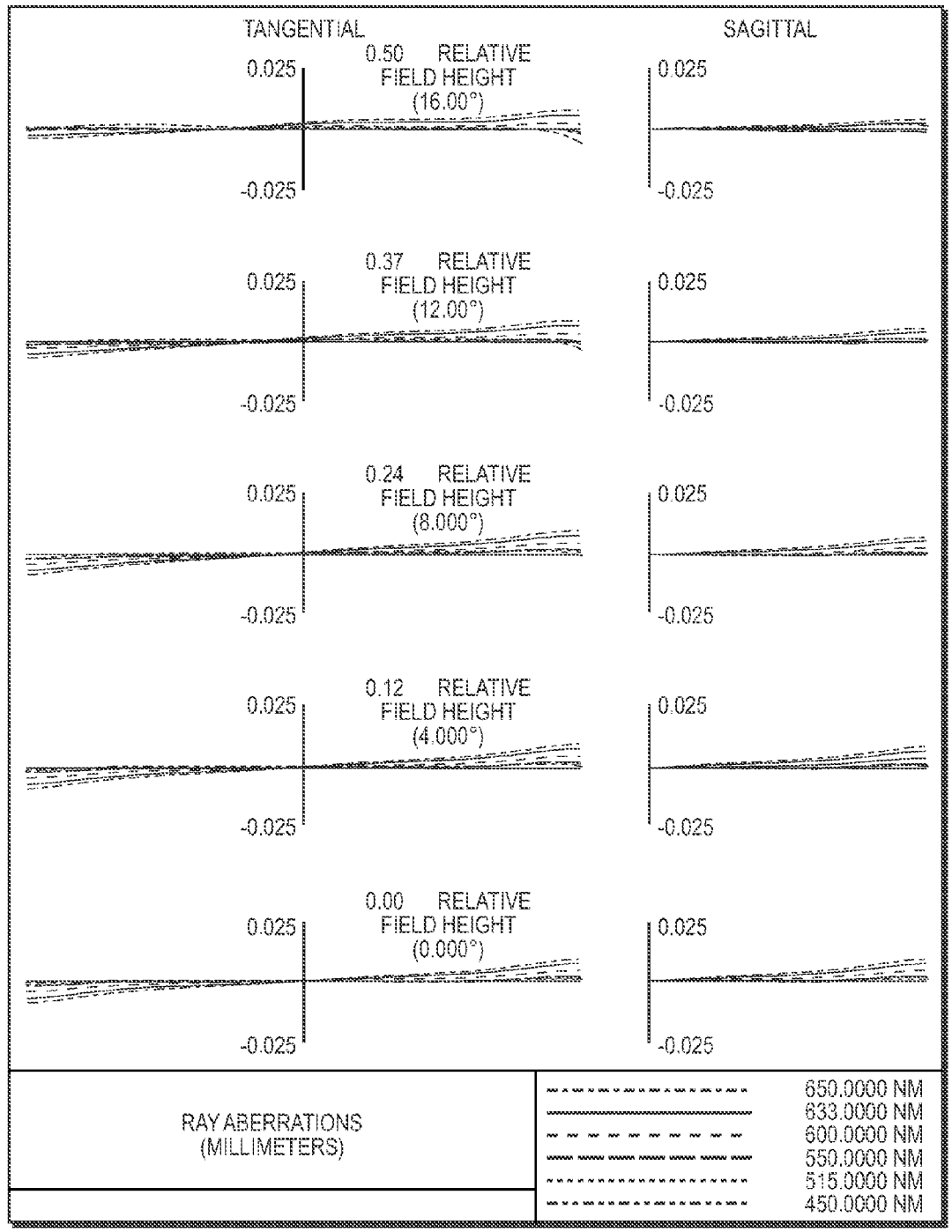
FIG. 11A includes a plurality of graphs presenting RIM RAY curves for the embodiment of FIG. 8.
Figure 11B:
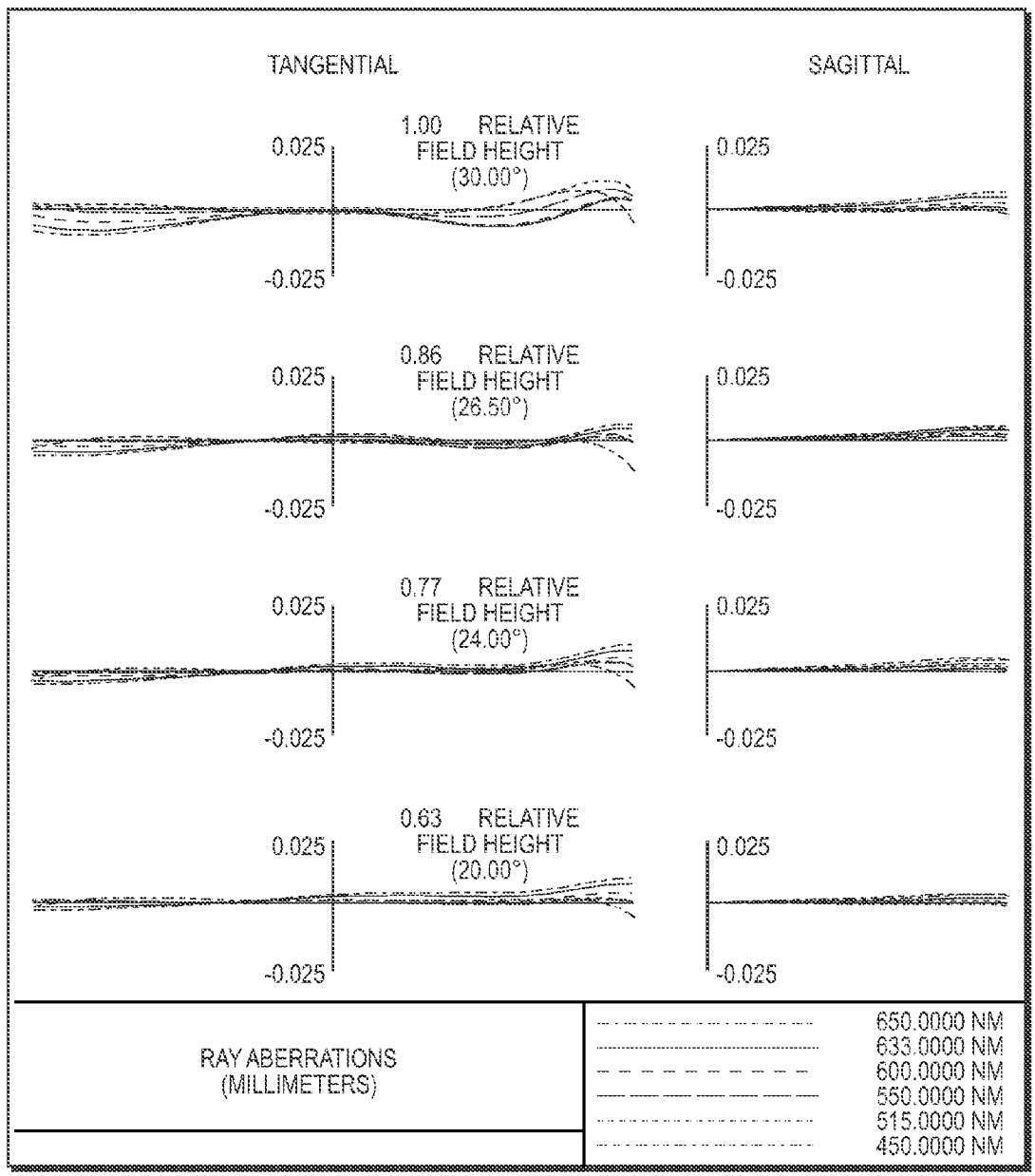
FIG. 11B includes additional graphs presenting RIM RAY curves for the embodiment of FIG. 8.
Figure 12A:
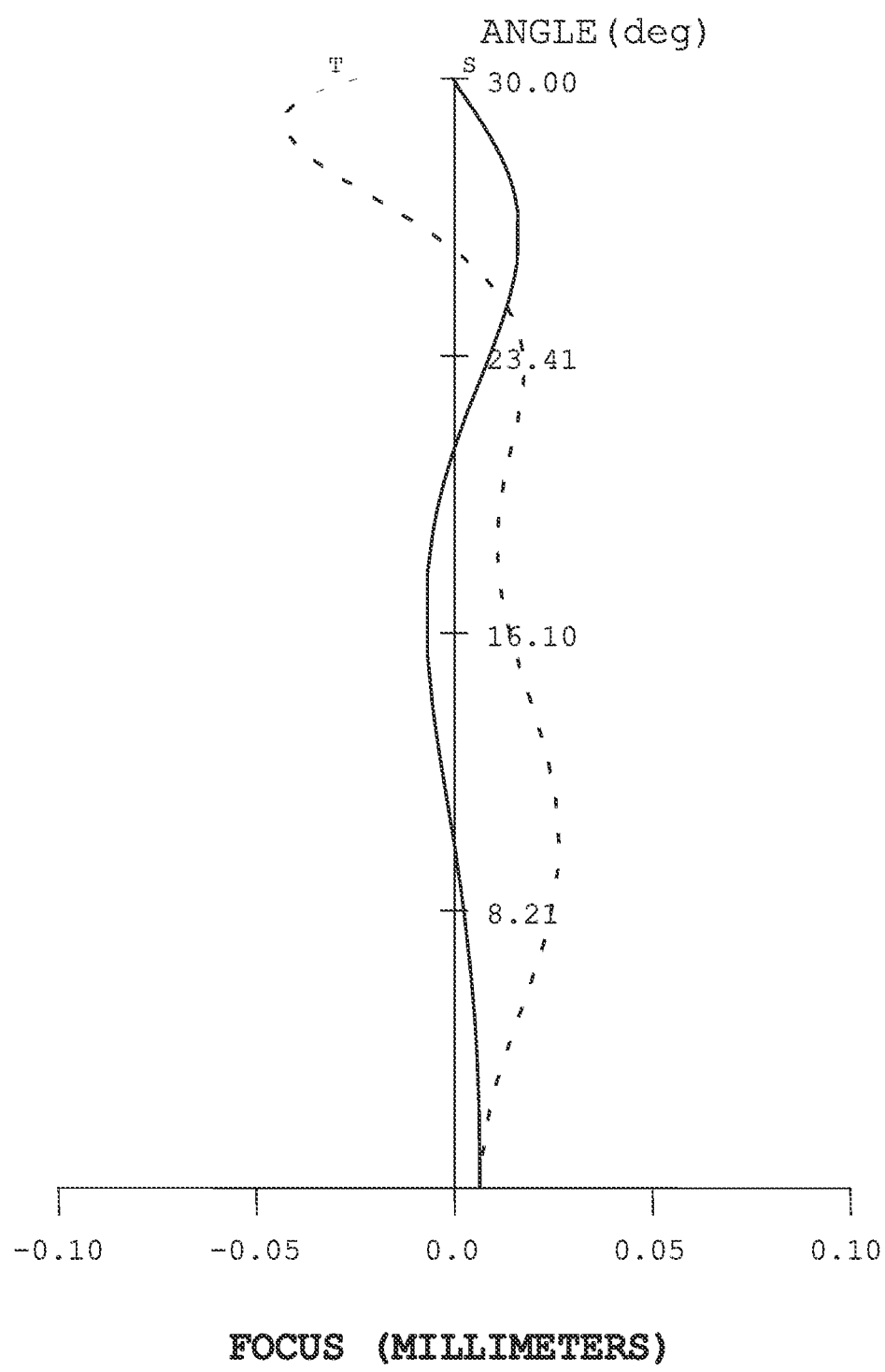
FIG. 12A presents a graph of field aberration data for the embodiment of FIG. 8.
Figure 12B:
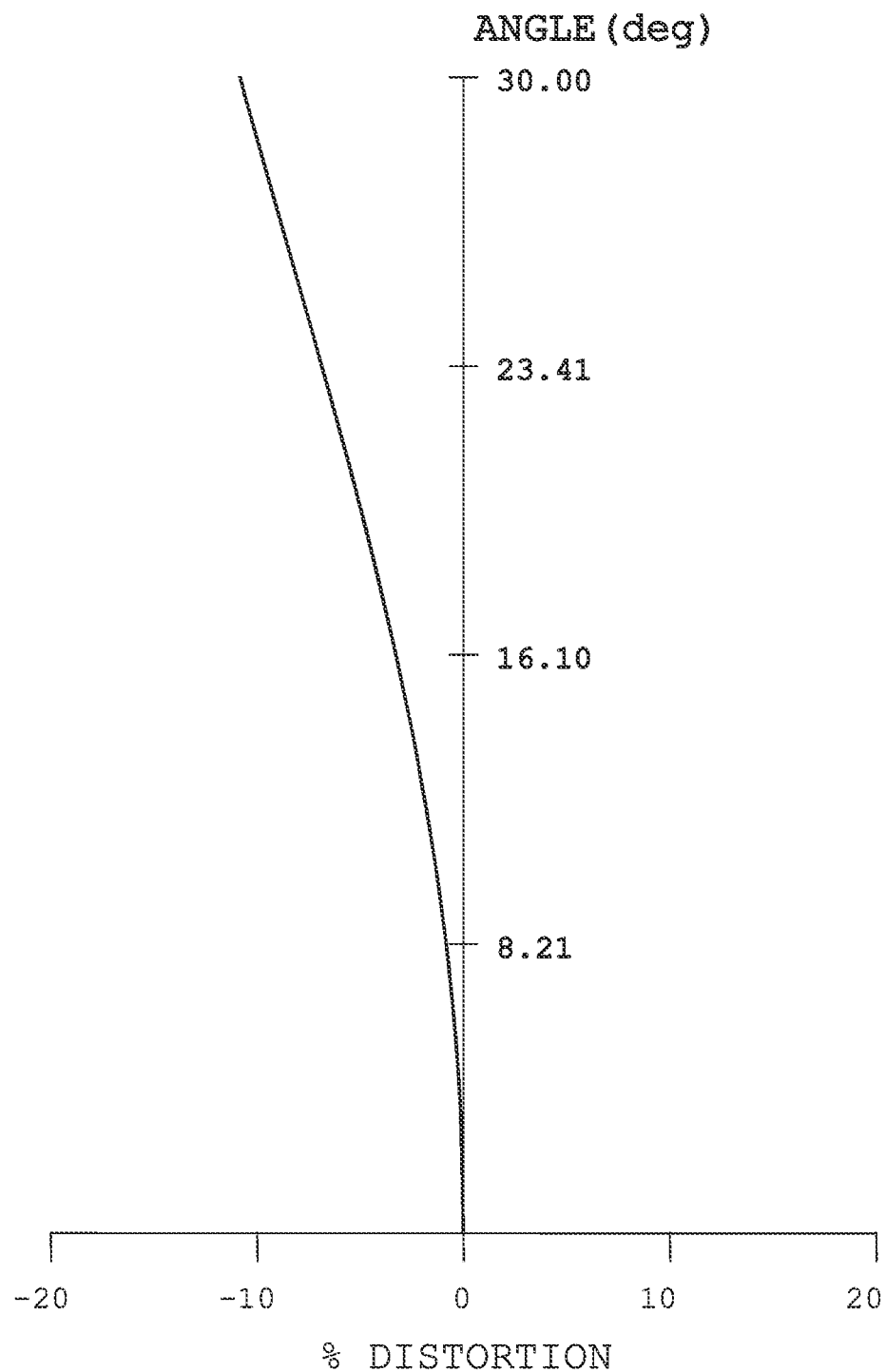
FIG. 12B presents a graph of distortion data for the embodiment of FIG. 8.
Figure 13:
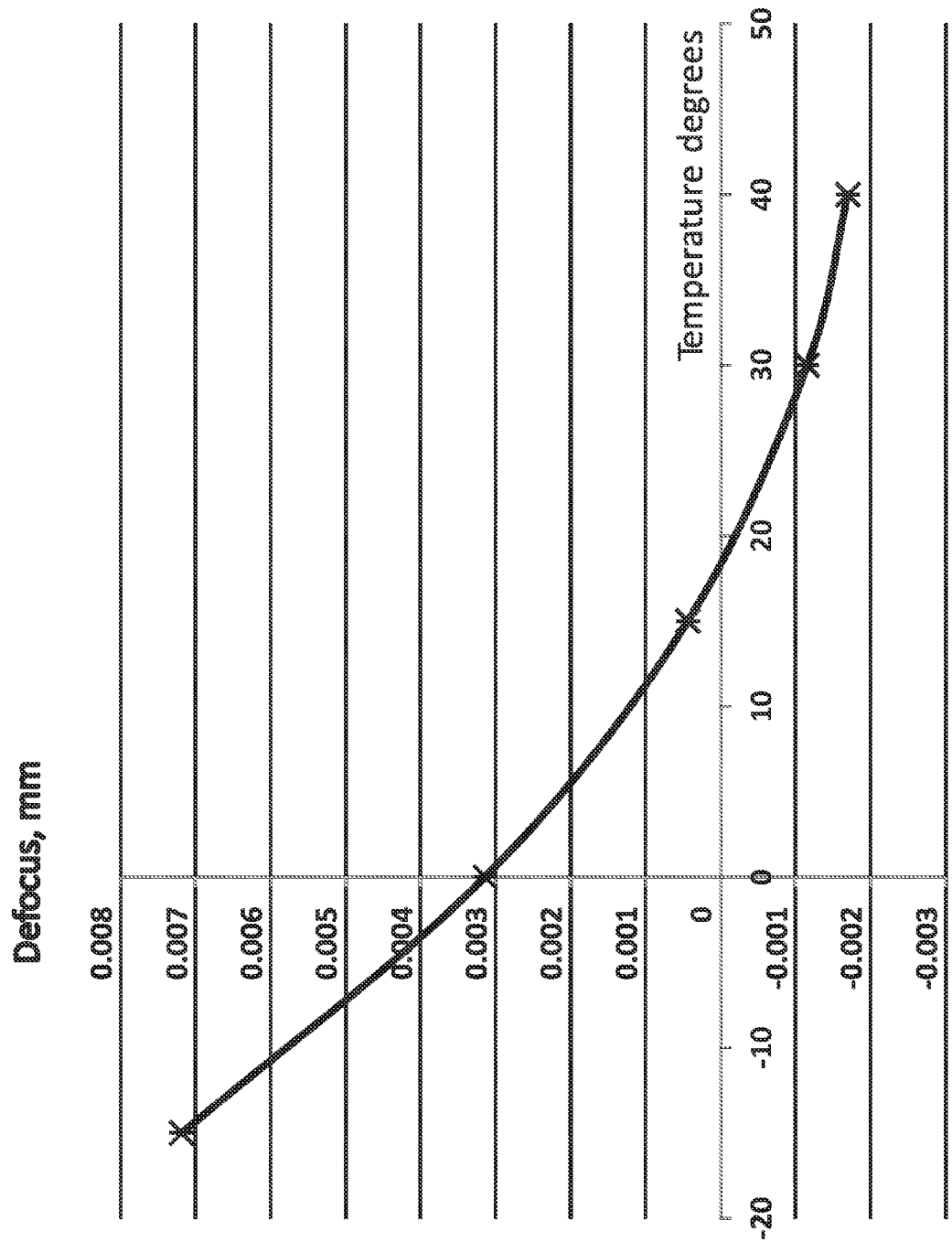
FIG. 13 is a graph presenting environmental analysis for the embodiment of FIG. 8.

Wave front data for the embodiment of FIG. 8 is presented in FIG. 9, and MTF data for the second embodiment is presented in FIG. 10A and FIG. 10B. The wave front is well corrected over the whole spectrum, and the polychromatic MTF shows good resolution and contract over the entire field of view. The RIM RAY curves in FIG. 11A and FIG. 11B show the spherical aberration, coma and chromatic and apochromatic correction over a wavelength range of 450 nm to 650 nm. Astigmatism data is presented in FIG. 12A and distortion data is presented in FIG. 12B. The distortion corresponds to the F-theta law. Data regarding the change of the focus with temperature is presented in FIG. 13. The defocus over the temperature range of −15° to 45° is 9 µm, which is much less than depth of focus. Lack of telecentricity is less than 6° across the field of view. The prescription of the lens of FIG. 8 is presented in FIG. 14. The optical materials of the embodiment include optical glasses that are common and widely available commercially.

Figure 15:
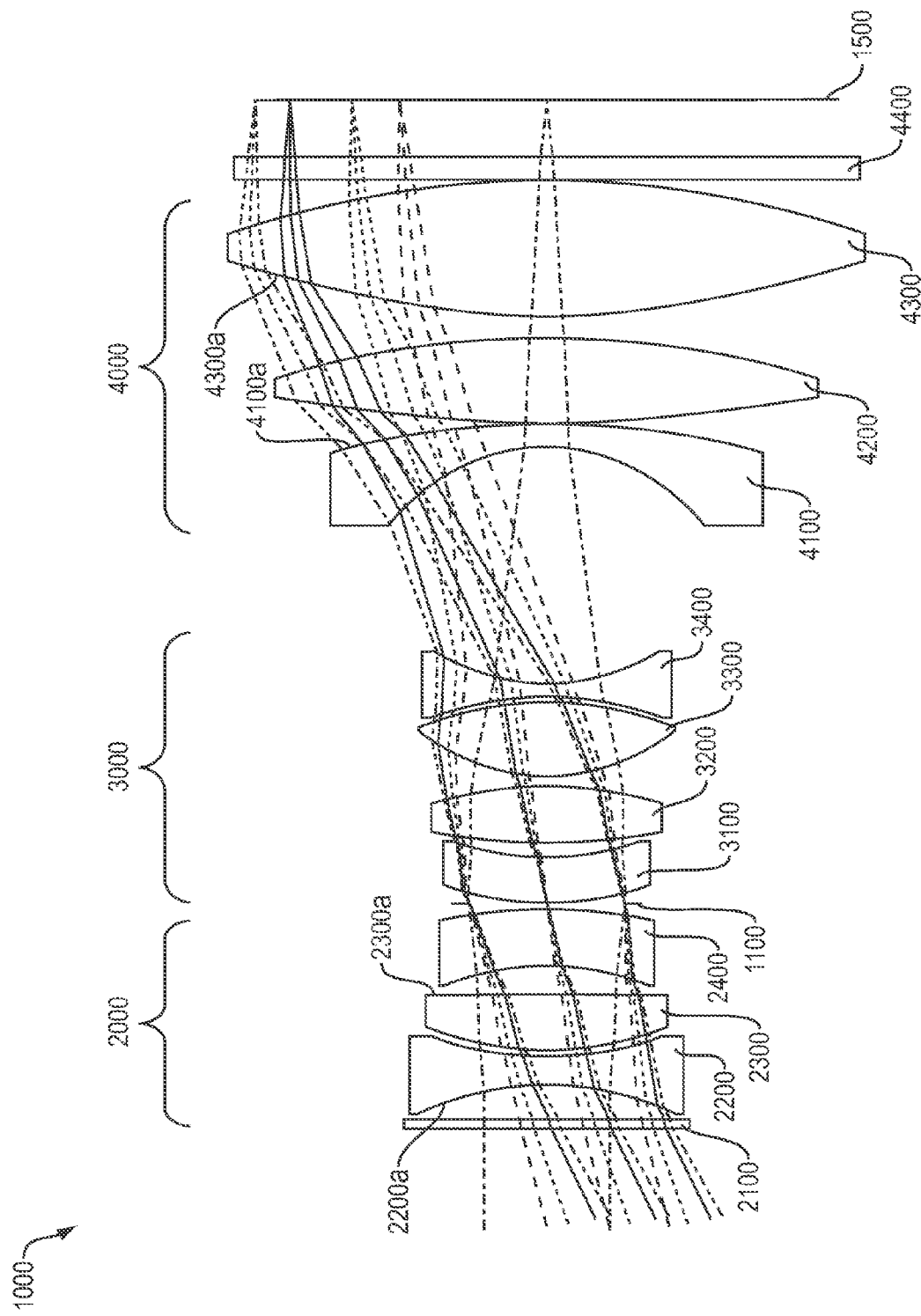
FIG. 15 is a cross sectional side view illustrating a third embodiment of the present invention.

FIG. 15 is a cross-sectional illustration of a third embodiment of the F-theta athermal lens 1000 of the present invention. The lens 1000 includes a front window 2100, a first optical group 2000, a second optical group 3000, a third optical group 4000 and a back window 4400 in the stated order from the object to the image plane. The aperture stop 1100 is located between the first 2000 and second 3000 optical groups. An image of a remote object is formed on a focal plane array 1500. In embodiments, the focal plane array 1500 incorporates CMOS with micro lenses, 2×2 Bayer filter geometry, and 1.8 Giga pixels. In other embodiments, the image surface 1500 may incorporate CCD devices or a direct viewing screen.

The first optical group 2000 has an overall negative optical power and is configured to receive light from the remote object and to direct the diverged light onto the second optical group 3000. The first optical group 2000 includes three optical elements 2200, 2300 and 2400, having, in order from the remote object to the image plane, a negative optical power, a positive optical power and a negative optical power. As can be seen in FIG. 15, the first optical element 2200 of the first optical group 2000 has a negative optical power and is a double concave lens. The first surface 2200a of the first optical element 2200 is aspherical so as to correct the spherical aberration and to achieve the low F# of the lens 1000. The second optical element 2300 of the first optical group 2000 has a positive optical power and is a double convex lens. The second surface 2300a of the second optical element 2300 is aspherical so as to correct pupil spherical aberration and coma. The third optical element 2400 of the first optical group 2000 has a negative optical power and is shaped as a meniscus whose concave surface faces toward the object. The mutual configuration and choice of glasses of the three optical elements 2200, 2300, 2400 in the first optical group 2000 provide athermalization of the lens 1000.

The second optical group 3000 has a positive overall optical power and is configured to converge light from the first optical group 2000 and to direct the converged light onto the third optical group 4000. The second optical group 3000 includes four optical elements 3100, 3200, 3300 and 3400, having in order from the object to the image plane 1500 a negative optical power, a positive optical power, a positive optical power and a negative optical power. The first optical element 3100 of the second optical group 3000 is shaped as a meniscus whose concave surface faces toward the image. The second optical element 3200 of the second optical group 3000 is a double convex lens. The third 3300 and fourth 3400 optical elements of the second optical group are both double convex lenses.

The mutual configuration of the four optical elements 3100, 3200, 3300 and 3400 in the second optical group 3000 provides correction of axial chromatic aberration and spherochromatism through the wavelength range of 450 nm to 650 nm, while satisfying relationships among the optical elements required to achieve high resolution of the lens 1000.

The third optical group 4000 has a positive overall power and is configured to further converge the light from the second optical group 3000 and to focus the converged light onto the focal plane array 1500. The third optical group 4000 includes three optical elements 4100, 4200 lnd 4300, having, in order from the object to the image plane a negative optical power, a positive optical power and a positive optical power respectively. The first optical element 4100 of the third optical group 4000 has a negative optical power and is shaped as a negative meniscus lens whose concave surface faces toward the object. The second surface 4100$a$ of the first element 4100 is aspherical so as to correct a residual astigmatism across the field of view. The second optical element 4200 of the third optical group is a double convex lens. The third optical element 4300 of the third optical group is a double convex lens. The first surface 4300$a$ of the third optical element 4300 is aspherical so as to correct residual coma and distortion shape across the field of view, and to achieve telecentricity for the beam at the image space.

The mutual configuration of the third optical group elements provides correction of field curvature, astigmatism and distortion.

The mutual combination of glass refractive indices and Abbe numbers of the optical elements in the three optical groups 2000, 3000 and 4000 provides apochromatic correction of the lens 1000. Axial color and lateral color are also corrected. The mutual combination of changes of refractive index with temperature provides athermalization of the lens 1000 over the temperature range −15° C. to +40° C.

The embodiment of FIG. 15 satisfies the following relations among the optical groups 2000, 3000, 4000 and their constituent optical elements:

$$-0.8 < F_{1000}/F'_{2000} < -0.6$$

$$1.45 < F'_{1000}/F'_{3000} < 1.75$$

$$0.25 < F'_{1000}/F'_{4000} < 0.45$$

$$0.85 < n_{2200}/n_{2400} = n_{2200}/n_{3400} = n_{2200}/n_{4100} = n_{2200}/n_{4200} < 1.1$$

$$0.75 < n_{2200}/n_{2300} = n_{2200}/n_{3200} = n_{2200}/n_{4300} = < 0.95$$

$$0.8 < n_{2200}/n_{3100} < 0.9$$

$$0.9 < n_{2200}/n_{3300} < 1.15$$

$$1.15 < V_{2200}/V_{2300} = V_{2200}/V_{2400} = V_{2200}/V_{3400} = V_{2200}/V_{4100} < 1.45$$

$$2.1 < V_{2200}/V_{3100} = V_{2200}/V_{4300} < 2.4$$

$$0.65 < V_{2200}/V_{3200} < 0.85$$

$$0.5 < V_{2200}/V_{3300} < 0.7$$

$$0.8 < V_{2200}/V_{4200} < 1.1$$

$$0.005 < P_{3200}/V_{3200} < 0.007$$

$$0.2 < dn/dT_{2200}/dn/dT_{2300} = dn/dT_{2200}/dn/dT_{2400} = dn/dT_{2200}/dn/dT_{3400} < 0.4$$

$$3 < dn/dT_{2200}/dn/dT_{3100} < 4$$

$$0.9 < dn/dT_{2200}/dn/dT_{4200} < 1.1$$

$$0.09 < dn/dT_{2200}/dn/dT_{4100} < 0.15$$

$$0.04 < dn/dT_{2200}/dn/dT_{3200} = dn/dT_{2200}/dn/dT_{4300} < 0.06$$

$$-0.09 < dn/dT_{2200}/dn/dT_{3300} < -0.06$$

Where:
$F'_{10}$ is the focal length of the lens 1000;
$F'_{2000}$, $F'_{3000}$ and $F'_{4000}$ are the focal lengths of the first, the second and the third optical groups 2000, 3000 and 4000;
$n_{2200}$, $n_{2300}$ and $n_{2400}$ are the refractive indices for the optical elements 2200, 2300 and 2400 of the first optical group 2000;
$n_{3100}$, $n_{3200}$, $n_{3300}$ and $n_{3400}$ are the refractive indices for the optical elements 3100, 3200, 3300 and 3400 of the second optical group 3000;
$n_{4100}$, $n_{4200}$ and $n_{4300}$ are the refractive indices for the optical elements 4100, 4200 and 4300 of the third optical group 4000;
$V_{2200}$, $V_{2300}$ and $V_{2400}$ are the Abbe numbers for the optical elements 2200, 2300 and 2400 of the first optical group 2000;
$V_{3100}$, $V_{3200}$, $V_{3300}$ and $V_{3400}$ are the Abbe numbers for the optical elements 3100, 3200, 3300 and 3400 of the second optical group 3000;
$V_{4100}$, $V_{4200}$, and $V_{4300}$ are the Abbe numbers for the optical elements 4100, 4200, and 4300 of the third optical group 4000;
$P_{3200}$ is the relative partial dispersion for F'-e spectrum for the second optical element 3200 of the second optical group 3000;
$dn/dT_{2200}$ is the refractive index change with temperature for the first optical element 2200 of the first optical group 2000;
$dn/dT_{2300}$ is the refractive index change with temperature for the second optical element 2300 of the first optical group 2000;
$dn/dT_{2400}$ is the refractive index change with temperature for the third optical element 2400 of the first optical group 2000;
$dn/dT_{3100}$ is the refractive index change with temperature for the first optical element 3100 of the second optical group 3000;
$dn/dT_{3200}$ is the refractive index change with temperature for the second optical element 3200 of the second optical group 3000;
$dn/dT_{3300}$ is the refractive index change with temperature for the third optical element 3300 of the second optical group 3000;

$dn/dT_{3400}$ is the refractive index change with temperature for the fourth optical element 3400 of the second optical group 3000;

$dn/dT_{4100}$ is the refractive index change with temperature for the first optical element 4100 of the third optical group 4000;

$dn/dT_{4200}$ is the refractive index change with temperature for the second optical element 4200 of the third optical group 4000; and $dn/dT_{4300}$ is the refractive index change with temperature for the third optical element 4300 of the third optical group 4000.

The selection of optical powers of optical groups and elements, the selection of glass refractive indices, Abbe numbers and partial dispersions, and the selection of dn/dT values provides a high resolution imaging lens with chromatic and apochromatic correction while the defocus caused by changes in temperature is less than the depth of focus of the lens.

Figure 17:
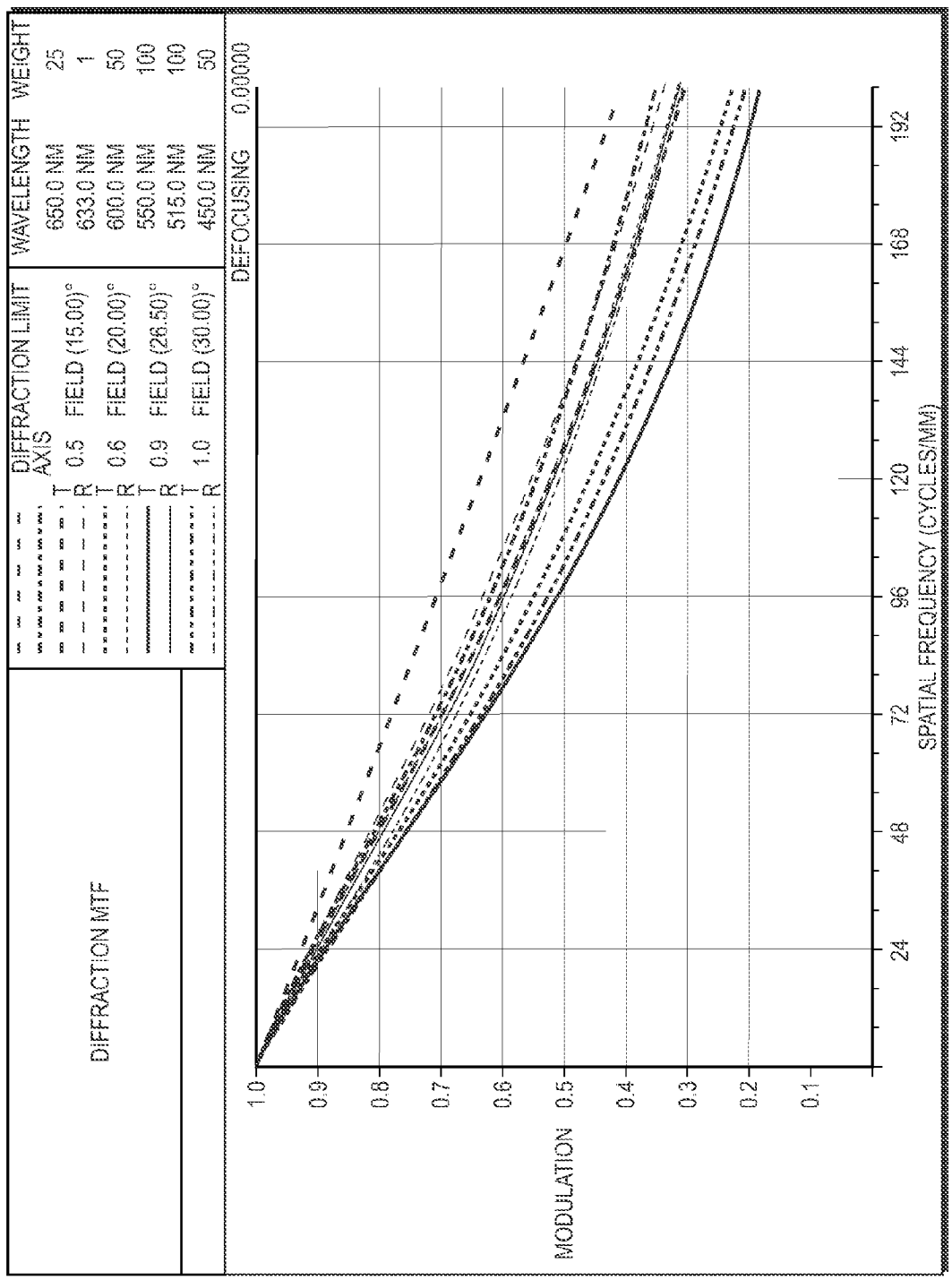
FIG. 17 is a graph presenting MTF data for the embodiment of FIG. 15.
Figure 18:
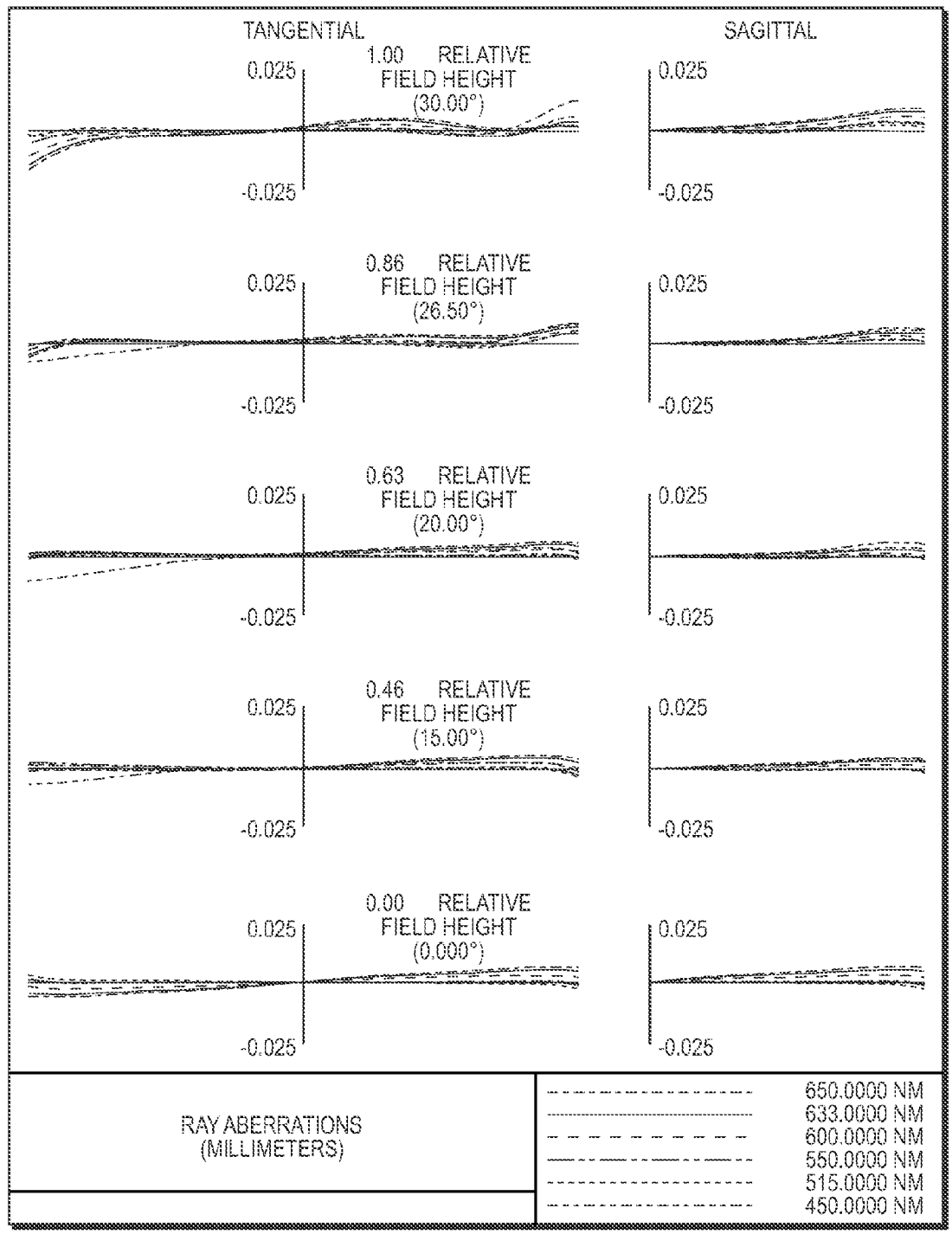
FIG. 18 includes a plurality of graphs presenting RIM RAY curves for the embodiment of FIG. 15.
Figure 19A:
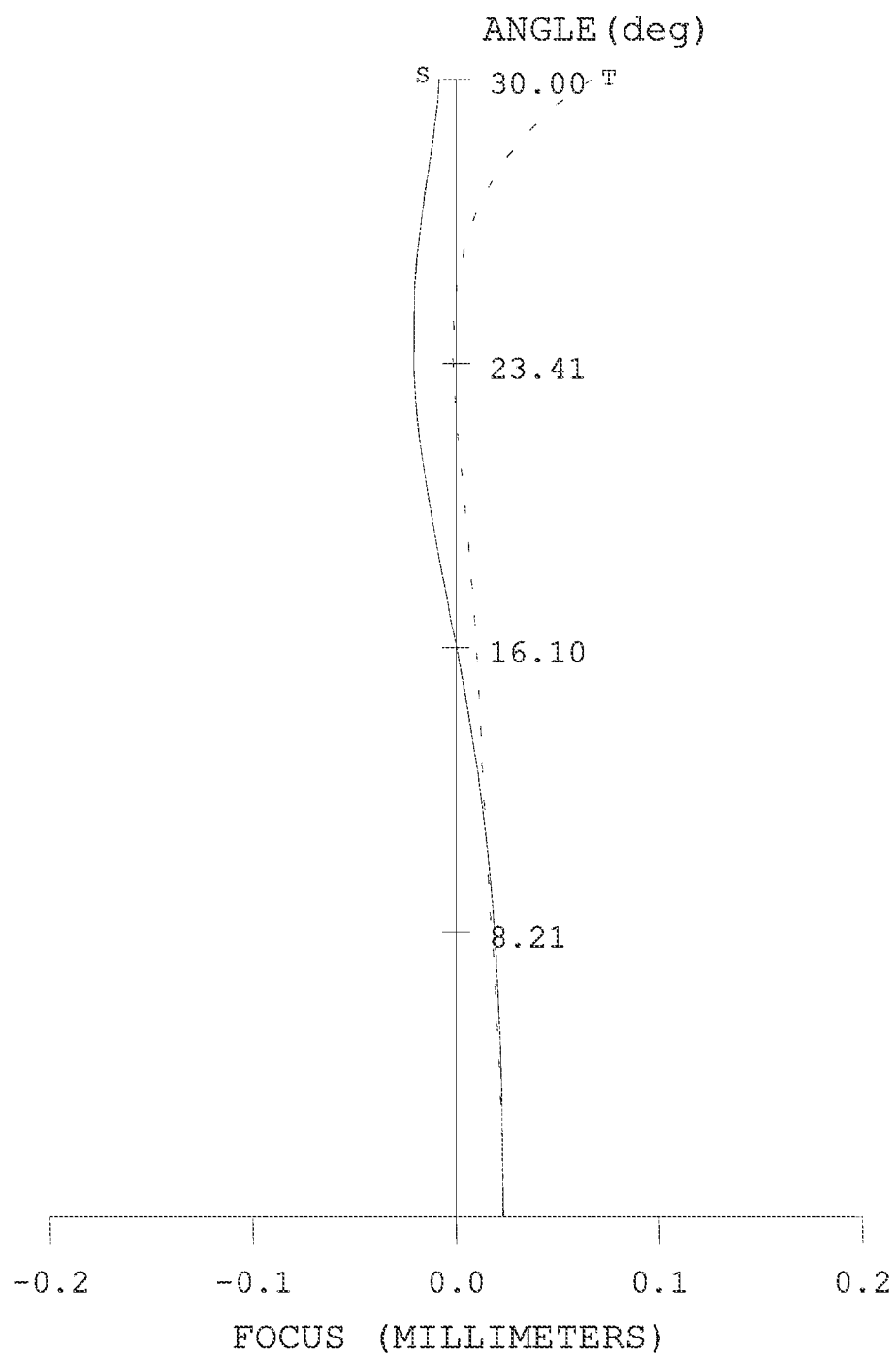
FIG. 19A presents a graph of field aberration data for the embodiment of FIG. 15.
Figure 19B:
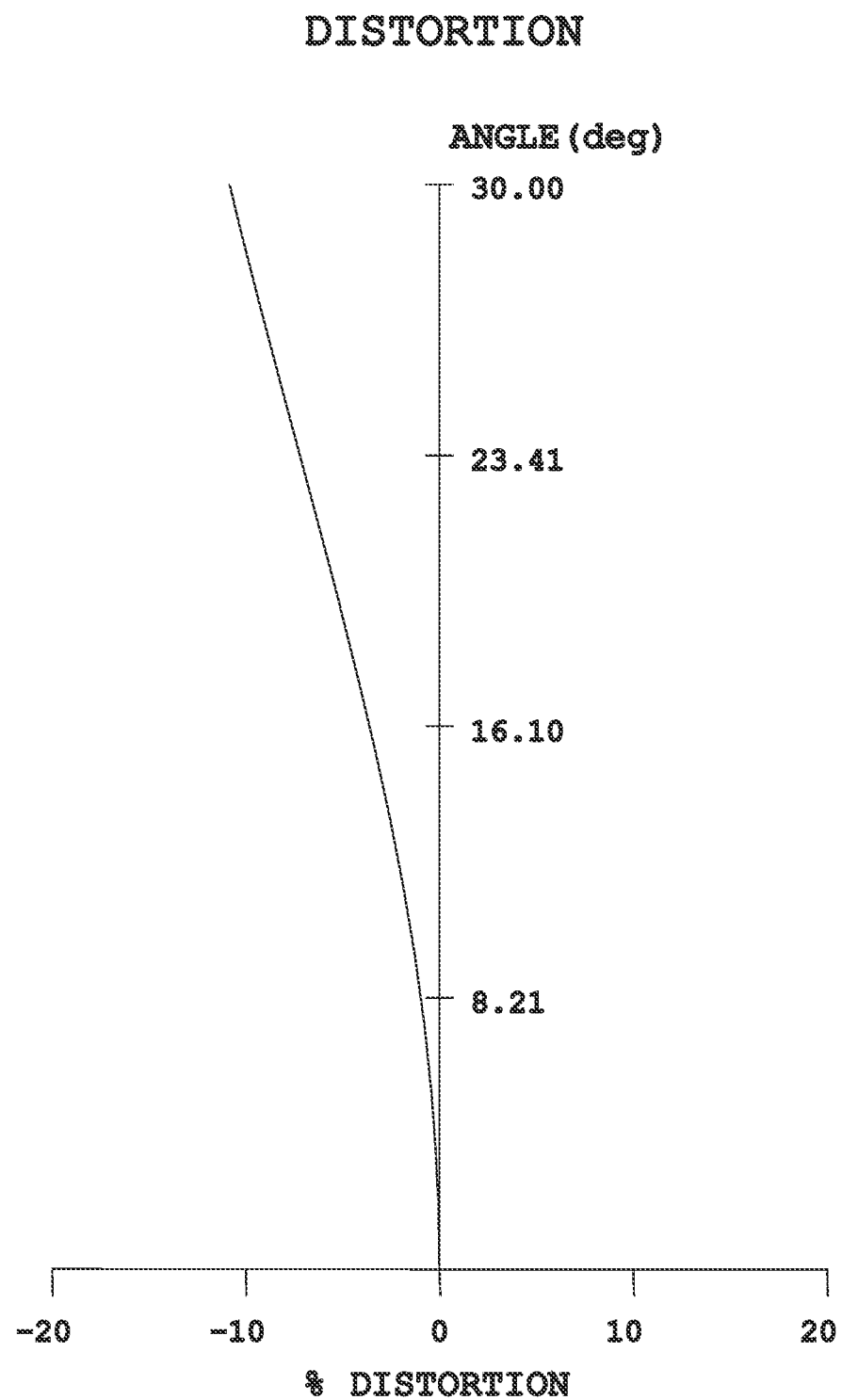
FIG. 19B presents a graph of distortion data for the embodiment of FIG. 15.
Figure 20:
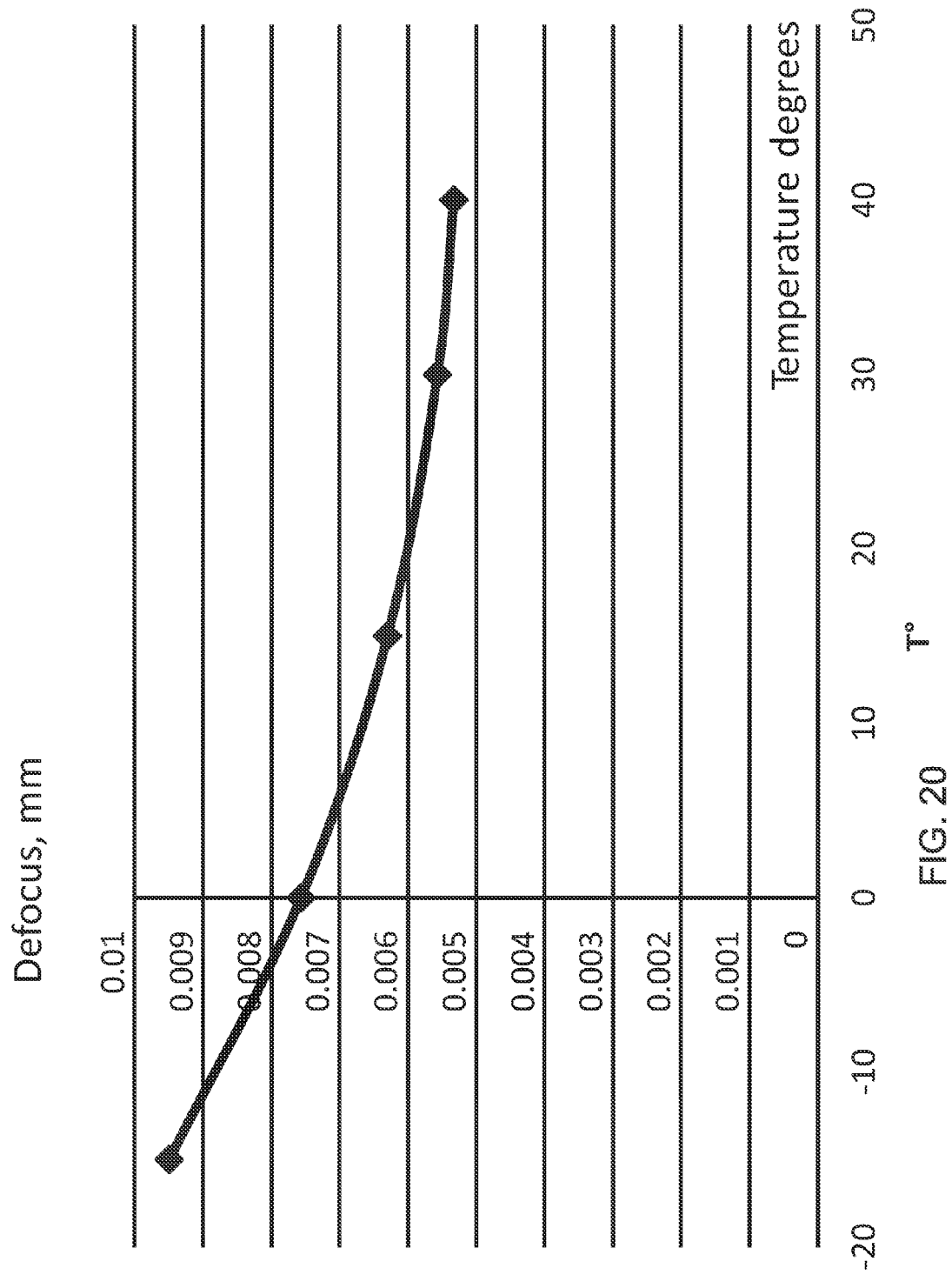
FIG. 20 is a graph presenting environmental analysis for the embodiment of FIG. 15.

Wave front and MTF data for the embodiment of FIG. 15 is presented in FIG. 16 and FIG. 17 respectively. The wave front is well corrected over the whole wavelength range and is polychromatic. The MTF shows good resolution and contract over the entire field. The RIM RAY curves in FIG. 18 show the spherical aberration, coma and chromatic and apochromatic corrections over the wavelength range of 450 nm to 650 nm. Astigmatism data is presented in FIG. 19A and distortion data is presented in FIG. 19B. The field is flat and the distortion corresponds to the F-theta law. Data regarding the change of the focus with temperature is presented in FIG. 20. The defocus over the temperature range of −15° to 40° is 5 µm, which is much less than the depth of focus. The lack of telecentricity is less than 6° across the field of view. The prescription of the lens of FIG. 15 is presented in FIG. 21. The optical materials of the embodiment include optical glasses that are common and widely available commercially.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An F-theta lens, comprising:
a first optical group including a plurality of optical elements;
a second optical group, including exactly four optical elements;
an aperture located between the first and second optical groups; and
a third optical group, including exactly three optical elements,
the F-number of the lens being not more than 4.5
the lens having a full field of view of at least 60°, with a quality performance field of 53°,
the lens being telecentric to less than 6°,
the lens being apochromatic over a range of at least 450 nm to 650 nm, and
the lens being functionally insensitive to temperature over a range of at least −15° C. to +40° C.

2. The lens of claim 1, wherein the first optical group includes exactly five optical elements.

3. The lens of claim 1, wherein the first optical group includes exactly three optical elements, one of the optical elements being made of sapphire.

4. The lens of claim 1, wherein the lens is athermal over the temperature range of at least −15° C. to +40° C.

5. The lens of claim 1, wherein the lens has a focal plane of at least 104 mm.

6. The lens of claim 5, wherein the lens is compatible for use with a CMOS 1.8 gigapixel multiple FPA (focal plane array) having a 2×2 Bayer filter geometry and a pixel size of 2.2 µm×2.2 µm, wherein each CMOS image sensor pixel includes a series of dielectric layers above the photo detector, with a micro lens on top of each pixel to focus light onto the active area of the pixel floor, thereby minimizing both the amount of light lost and the amount of light incident on adjacent photodiodes.

7. The lens of claim 1, wherein the lens is secondary color corrected.

8. The lens of claim 1, wherein the first two optical groups can be contained within a housing having an outer diameter of 65 mm.

9. The lens of claim 1, wherein at least one surface of one of the optical elements in the first optical group is aspherical, and at least one surface of one of the optical elements in the third optical group is aspherical.

10. The lens of claim 1, wherein one of the first two optical groups corrects the lens for spherical aberration, axial chromatism, spherochromatism, coma, and astigmatism without causing distortion, the other of the first two optical groups corrects the lens for residual chromatic aberration, spherical aberration, coma, and astigmatism while achieving athermalization of the lens through the range of at least 450 nm to 650 nm, and the third optical group corrects field curvature, astigmatism and distortion.

11. The lens of claim 1, wherein:
all three optical groups have positive powers;
the first optical group comprises five optical elements, having, in order, a negative optical power, a positive optical power, a negative optical power, a positive optical power and a positive optical power, the first optical group being arranged to converge light received from an object and to direct the converged light onto the second optical group;
the second optical group includes four optical elements, having, in order, a negative optical power, a positive optical power, a positive optical power and a negative optical power, the second optical group being arranged to further converge light received from the first optical group and to direct the converged light onto the third optical group;
the third optical group includes three optical elements having, in order, a negative optical power, a positive optical power and a positive optical power, the third optical group being arranged to focus the light from the second optical group onto the imaging surface;
the focal lengths of the lens and of the optical groups satisfy the relationships $$0.8 < F'_{10}/F'_{20} < 1.1,$$

$$0.04 < F'_{10}/F'_{30} < 0.07, \text{ and}$$

$$0.3 < F'_{10}/F'_{40} < 0.5,$$

where
$F'_{10}$ is the focal length of the lens, and
$F'_{20}$, $F'_{30}$ and $F'_{40}$ are focal lengths of the first, the second and the third optical groups respectively;
the indexes of refraction of the optical elements satisfy the relationships $$0.85 < n_{22}/n_{26} = n_{22}/n_{34} = n_{22}/n_{42} = n_{22}/n_{43} < 1.15,$$

$$0.95 < n_{22}/n_{23} = n_{22}/n_{24} = n_{22}/n_{31} = < 1.25,$$

$0.80 < n_{22}/n_{25} < 1.1$, and $1.05 < n_{22}/n_{32} = n_{22}/n_{33} = n_{22}/n_{41} < 1.35$, where $n_{22}$, $n_{23}$, $n_{24}$, $n_{25}$ and $n_{26}$ are the refractive indices of the first, second, third, fourth, and fifth optical elements of the first optical group, respectively, $n_{31}$, $n_{32}$, $n_{33}$ and $n_{34}$ are the refractive indices of the first, second, third, and fourth optical elements of the second optical group, respectively, and $n_{41}$, $n_{42}$ and $n_{43}$ are the refractive indices of the first, second, and third optical elements of the third optical group, respectively;

the Abbe numbers for the optical elements satisfy the relationships $0.8 < V_{22}/V_{24} = V_{22}/V_{25} = V_{22}/V_{26} = V_{22}/V_{34} = V_{22}/V_{42} = V_{22}/V_{43} < 1.2$, $1.45 < V_{22}/V_{23} = V_{22}/V_{31} = V_{22}/V_{41} < 0.8$, $0.25 < V_{22}/V_{32} < 0.45$, and $0.2 < V_{22}/V_{33} < 0.4$, where $V_{22}$, $V_{23}$, $V_{24}$, $V_{25}$ and $V_{26}$ are the Abbe numbers for the first, second, third, fourth, and fifth optical elements of the first optical group, respectively, $V_{31}$, $V_{32}$, $V_{33}$ and $V_{34}$ are the Abbe numbers for the first, second, third, and fourth optical elements of the second optical group, respectively, and $V_{41}$, $V_{42}$, and $V_{43}$ are the Abbe numbers for the first, second, and third optical elements of the third optical group, respectively;

the relative partial dispersions of the optical elements satisfy the relationship $0.0055 < P_{32}/V_{32} = P_{33}/V_{33} << 0.0085$, where $P_{32}$ is a relative partial dispersion for the F'-e spectrum for the second optical element of the second optical group, and $P_{33}$ is a relative partial dispersion for the F'-e spectrum for the third optical element of the second optical group; and the changes of refractive index with temperature satisfy the relationships $0.85 < dn/dT_{22}/dn/dT_{26} = dn/dT_{22}/dn/dT_{34} < 1.2$, $0.07 < dn/dT_{22}/dn/dT_{23} = dn/dT_{22}/dn/dT_{31} < 0.1$, $-0.5 < dn/dT_{22}/dn/dT_{24} < -0.3$, $0.2 < dn/dT_{22}/dn/dT_{25} < 0.35$, $-0.12 < dn/dT_{22}/dn/dT_{32} < -0.07$, $dn/dT_{22}/dn/dT_{42} = dn/dT_{22}/dn/dT_{43} < 0.5$, $-0.04 < dn/dT_{22}/dn/dT_{33} < -0.02$, and $0.035 < dn/dT_{22}/dn/dT_{41} < 0.07$, where $dn/dT_{22}$ is the refractive index change with temperature for the first optical element of the first optical group, $dn/dT_{23}$ is the refractive index change with temperature for the second optical element of the first optical group, $dn/dT_{24}$ is the refractive index change with temperature for the third optical element of the first optical group, $dn/dT_{25}$ is the refractive index change with temperature for the fourth optical element of the first optical group, $dn/dT_{26}$ is the refractive index change with temperature for the fifth optical element of the first optical group, $dn/dT_{31}$ is the refractive index change with temperature for the first optical element of the second optical group, $dn/dT_{32}$ is the refractive index change with temperature for the second optical element of the second optical group, $dn/dT_{33}$ is the refractive index change with temperature for the third optical element of the second optical group, $dn/dT_{34}$ is the refractive index change with temperature for the fourth optical element of the second optical group, $dn/dT_{41}$ is the refractive index change with temperature for the first optical element of the third optical group, $dn/dT_{42}$ is the refractive index change with temperature for the second optical element of the third optical group, and $dn/dT_{43}$ is the refractive index change with temperature for the third optical element of the third optical group.

12. The lens of claim 11, wherein:
the first optical element of the first optical group is a double concave lens;
the second optical element of the first optical group is a double convex lens;
the third optical element of the first optical group is a double concave lens;
the fourth optical element of the first optical group is a double convex lens; and
the fifth optical element of the first optical group is shaped as a meniscus whose concave surface faces toward the image.

13. The lens of claim 12, wherein the second surface of the first element of the first optical group is aspherical.

14. The lens of claim 12, wherein the first surface of the fifth element of the first optical group is aspherical.

15. The lens of claim 11, wherein:
the first optical element of the second optical group is shaped as a meniscus whose concave surface faces toward the image;
the second optical element is a double convex lens;
the third optical element is a double convex lens; and
the fourth optical element is a double concave lens.

16. The lens of claim 11, wherein:
the first optical element of the third optical group is shaped as a negative meniscus lens whose concave surface faces toward the object;
the second optical element of the third optical group is shaped as a positive meniscus whose concave surface faces toward the object; and
the third optical element is a double convex lens.

17. The lens of claim 11, wherein the second surface of the first element of the third optical group is aspherical.

18. The lens of claim 11, wherein the first surface of the third element of the third optical group is aspherical.

19. The lens of claim 1, wherein
the first optical group has a negative optical power, and the second and third optical groups have positive optical powers;
the first optical group includes five optical elements, having, in order a negative optical power, a positive optical power, a positive optical power, a negative optical power and a positive optical power, the first optical group being arranged to diverge light received from an object and to direct the diverged light onto the second optical group;

the second optical group includes four optical elements, having, in order, a positive optical power, a positive optical power, a positive optical power and a negative optical power, the second optical group being arranged to converge light received from the first optical group and to direct the converged light onto the third optical group;

the third optical group includes three optical elements having, in order, a negative optical power, a positive optical power and a positive optical power, the third optical group being arranged to focus light from the second optical group onto an imaging surface;

the aperture stop is positioned between the first and the second optical groups;

the focal lengths of the lens and of the optical groups satisfy the relationships $$-0.08 < F'_{100}/F'_{200} < -0.06,$$

$$0.8 < F'_{100}/F'_{300} < 0.9, \text{ and}$$

$$0.2 < F'_{100}/F'_{400} < 0.4,$$

where $F'_{100}$ is the focal length of the lens, and $F'_{200}$, $F'_{300}$ and $F'_{400}$ are focal lengths of the first, the second, and the third optical groups respectively;

the indexes of refraction of the optical elements satisfy the relationships $$0.8 < n_{220}/n_{230} = n_{220}/n_{240} = n_{220}/n_{310} = n_{220}/n_{340} = n_{220}/n_{420} = n_{220}/n_{430} < 1.1,$$

$$1.1 < n_{220}/n_{260} = n_{220}/n_{320} = n_{220}/n_{330} = n_{220}/n_{410} = < 1.35, \text{ and}$$

$$0.9 < n_{220}/n_{250} < 1.2,$$

where $n_{220}$, $n_{230}$, $n_{240}$, $n_{250}$ and $n_{260}$ are refractive indices for the first, second, third, fourth, and fifth optical elements of the first optical group, respectively, $n_{310}$, $n_{320}$, $n_{330}$ and $n_{340}$ are refractive indices for the first, second, third, and fourth optical elements of the second optical group, respectively, and $n_{410}$, $n_{420}$ and $n_{430}$ are refractive indices for the first, second, and third optical elements of the third optical group, respectively;

the Abbe numbers for the optical elements satisfy the relationships $$0.9 < V_{220}/V_{230} = V_{220}/V_{240} = V_{220}/V_{310} = V_{220}/V_{340} = V_{220}/V_{420} = V_{220}/V_{430} < 1.3,$$

$$0.8 < V_{220}/V_{250} < 1.1,$$

$$0.3 < V_{220}/V_{260} = V_{220}/V_{320} < 0.5,$$

$$0.2 < V_{220}/V_{330} < 0.4,$$

$$0.5 < V_{220}/V_{410} < 0.7,$$

where $V_{220}$, $V_{230}$, $V_{240}$, $V_{250}$ and $V_{260}$ are Abbe numbers for the first, second, third, fourth, and fifth optical elements of the first optical group, respectively, $V_{310}$, $V_{320}$, $V_{330}$ and $V_{340}$ are Abbe numbers for the first, second, third, and fourth optical elements of the second optical group, respectively, and $V_{410}$, $V_{420}$, and $V_{430}$ are Abbe numbers for the first, second, and third, optical elements of the third optical group, respectively, the relative partial dispersions of the optical elements satisfy the relationship $$0.0055 < P_{320}/V_{320} = P_{330}/V_{330} << 0.0085,$$

where $P_{320}$ is a relative partial dispersion for F'-e spectrum for the second optical element of the second optical group, and $P_{330}$ is a relative partial dispersion for F'-e spectrum for the third optical element of the second optical group, and the changes of refractive index with temperature satisfy the relationships $$0.2 < dn/dT_{220}/dn/dT_{230} = dn/dT_{220}/dn/dT_{240} = dn/dT_{220}/dn/dT_{430} < 0.4,$$

$$-0.55 < dn/dT_{220}/dn/dT_{250} < -0.35,$$

$$0.08 < dn/dT_{220}/dn/dT_{260} < 0.1,$$

$$0.1 < dn/dT_{220}/dn/dT_{310} = dn/dT_{220}/dn/dT_{420} < 0.3,$$

$$-0.3 < dn/dT_{220}/dn/dT_{320} < -0.08,$$

$$-0.04 < dn/dT_{220}/dn/dT_{330} < -0.02,$$

$$0.9 < dn/dT_{220}/dn/dT_{340} < 1.1, \text{ and}$$

$$0.35 < dn/dT_{220}/dn/dT_{410} < 0.55,$$

where dn/dT is the refractive index change with temperature for the first optical element of the first optical group, dn/dT is the refractive index change with temperature for the second optical element of the first optical group, dn/dT is the refractive index change with temperature for the third optical element of the first optical group, dn/dT is the refractive index change with temperature for the second optical element of the first optical group, dn/dT is the refractive index change with temperature for the second optical element of the first optical group, dn/dT is the refractive index change with temperature for the first optical element of the second optical group, dn/dT is the refractive index change with temperature for the second optical element of the second optical group, dn/dT is the refractive index change with temperature for the third optical element of the second optical group, dn/dT is the refractive index change with temperature for the fourth optical element of the second optical group, dn/dT is the refractive index change with temperature for the first optical element of the third optical group, dn/dT is the refractive index change with temperature for the second optical element of the third optical group, and dn/dT is the refractive index change with temperature for the third optical element of the third optical group.

20. The lens of claim 19, wherein:

the first optical element of the first optical group is a double concave lens;

the second optical element of the first optical group is shaped as a meniscus whose concave surface faces toward the object;

the third optical element of the first optical group is shaped as a meniscus whose concave surface faces toward the object;

the fourth optical element of the first optical group is shaped as a meniscus whose concave surface faces toward the object; and the fifth optical element of the first optical group is shaped as a meniscus whose concave surface faces toward the object.

21. The lens of claim 20, wherein the second surface of the first element of the first optical group is aspherical.

22. The lens of claim 20, wherein the second surface of the second element of the first optical group is aspherical.

23. The lens of claim 19, wherein:
the first optical element of the second optical group is shaped as a positive meniscus whose concave surface faces toward the image;
the second optical element is a double convex lens;
the third optical element is in a double convex lens; and
the fourth optical is a double concave lens.

24. The lens of claim 19, wherein:
the first optical element of the third optical group is shaped as a negative meniscus lens whose concave surface faces toward the object;
the second optical element of the third optical group a double convex lens; and
the third optical element of the third optical group is a double convex lens.

25. The lens of claim 24, wherein the second surface of the first element of the third optical group is aspherical.

26. The lens of claim 24, wherein the first surface of the third element of the third optical group is aspherical.

27. The lens of claim 1, wherein:
the first optical group has a negative optical power, and the second and third optical groups have positive optical powers;
the first optical group includes three optical elements, having, in order, a negative optical power, a positive optical power and a negative optical power, the first optical group being arranged to diverge light received from an object and to direct the diverged light onto the second optical group;
the second optical group includes four optical elements, having, in order, a negative optical power, a positive optical power, a positive optical power and a negative optical power, the second optical group being arranged to converge light received from the first optical group and to direct the converged light onto the third optical group;
the third optical group comprises three optical elements having, in order, a negative optical power, a positive optical power and a positive optical power, the third optical group being arranged to focus the light from the second optical group onto the imaging surface;
the aperture stop is positioned between the first and the second optical groups;
the focal lengths of the lens and of the optical groups satisfy the relationships $$-0.8 < F''_{1000}/F'_{2000} < -0.6,$$

$$1.45 < F'_{1000}/F'_{3000} < 1.75, \text{ and}$$

$$0.25 < F'_{1000}/F'_{4000} < 0.45,$$

where
$F'_{10}$ is the focal length of the lens, and
$F'_{2000}$, $F'_{3000}$ and $F'_{4000}$ are focal lengths of the first, the second and the third optical groups respectively;
the indexes of refraction of the optical elements satisfy the relationships $$0.85 < n_{2200}/n_{2400} = n_{2200}/n_{3400} = n_{2200}/n_{4100} = n_{2200}/n_{4200} < 1.1,$$

$$0.75 < n_{2200}/n_{2300} = n_{2200}/n_{3200} = n_{2200}/n_{4300} = <0.95,$$

$$0.8 < n_{2200}/n_{3100} < 0.9, \text{ and}$$

$$0.9 < n_{2200}/n_{3300} < 1.15,$$

where
$n_{2200}$, $n_{2300}$ and $n_{2400}$ are refractive indices for the first, second, and third optical elements of the first optical group, respectively,
$n_{3100}$, $n_{3200}$, $n_{3300}$ and $n_{3400}$ are refractive indices for the first, second, third, and fourth optical elements of the second optical group, respectively, and
$n_{4100}$, $n_{4200}$ and $n_{4300}$ are refractive indices for the first, second, and third optical elements of the third optical group, respectively;
the Abbe numbers for the optical elements satisfy the relationships $$1.15 < V_{2200}/V_{2300} = V_{2200}/V_{2400} = V_{2200}/V_{3400} = V_{2200}/V_{4100} < 1.45,$$

$$2.1 < V_{2200}/V_{3100} = V_{2200}/V_{4300} < 2.4,$$

$$0.65 < V_{2200}/V_{3200} < 0.85,$$

$$0.5 < V_{2200}/V_{3300} < 0.75 \text{ and}$$

$$0.8 < V_{2200}/V_{4200} < 1.1,$$

where
$V_{2200}$, $V_{2300}$ and $V_{2400}$ are Abbe numbers for the first, second, and third optical elements of the first optical group, respectively,
$V_{3100}$, $V_{3200}$, $V_{3300}$ and $V_{3400}$ are Abbe numbers for the first, second, third, and fourth optical elements of the second optical group, respectively;
$V_{4100}$, $V_{4200}$, and $V_{4300}$ are Abbe numbers for the first, second, and third optical elements of the third optical group, respectively;
the relative partial dispersions of the optical elements satisfy the relationship $$0.005 < P_{3200}/V_{3200} < 0.007,$$

where
$P_{3200}$ is a relative partial dispersion for the F'-e spectrum for the second optical element of the second optical group; and
the changes of refractive index with temperature satisfy the relationships $$0.2 < dn/dT_{2200}/dn/dT_{2300} = dn/dT_{2200}/dn/dT_{2400} = dn/dT_{2200}/dn/dT_{3400} < 0.4,$$

$$3 < dn/dT_{2200}/dn/dT_{3100} < 4,$$

$$0.9 < dn/dT_{2200}/dn/dT_{4200} < 1.1,$$

$$0.09 < dn/dT_{2200}/dn/dT_{4100} < 0.15,$$

$0.04 < dn/dT_{2200}/dn/dT_{3200} = dn/dT_{2200}/dn/dT_{4300} < 0.06$, and $-0.09 < dn/dT_{2200}/dn/dT_{3300} < -0.06$, where $dn/dT_{2200}$ is the refractive index change with temperature for the first optical element of the first optical group, $dn/dT_{2300}$ is the refractive index change with temperature for the second optical element of the first optical group, $dn/dT_{2400}$ is the refractive index change with temperature for the third optical element of the first optical group, $dn/dT_{3100}$ is the refractive index change with temperature for the first optical element of the second optical group, $dn/dT_{3200}$ is the refractive index change with temperature for the second optical element of the second optical group, $dn/dT_{3300}$ is the refractive index change with temperature for the third optical element of the second optical group, $dn/dT_{3400}$ is the refractive index change with temperature for the fourth optical element of the second optical group, $dn/dT_{4100}$ is the refractive index change with temperature for the first optical element of the third optical group, $dn/dT_{4200}$ is the refractive index change with temperature for the second optical element of the third optical group, $dn/dT_{4300}$ is the refractive index change with temperature for the third optical element of the third optical group.

28. The lens of claim 27, wherein:
  the first optical element of the first optical group is a double concave lens;
  the second optical element of the first optical group is a double convex lens; and
  the third optical element of the first optical group is shaped as a meniscus whose concave surface faces toward the object.

29. The lens of claim 28, wherein the first surface of the first element of the first optical group is aspherical.

30. The lens of claim 28, wherein the second surface of the second element of the first optical group is aspherical.

31. The lens of claim 27, wherein:
  the first optical element of the second optical group is shaped as a meniscus whose concave surface faces toward the image;
  the second optical element of the second optical group is a double convex lens;
  the third optical element of the second optical group is in a form of a double convex lens; and
  the fourth optical element of the second optical group is a double concave lens.

32. The lens of claim 27, wherein:
  the first optical element of the third optical group is shaped as a negative meniscus lens whose concave surface faces toward the object;
  the second optical element of the third optical group a double convex lens; and
  the third optical element of the third optical group is a double convex lens.

33. The lens of claim 32, wherein the second surface of the first element of the third optical group is aspherical.

34. The lens of claim 33, wherein the first surface of the third element of the third optical group is aspherical.

35. The lens of claim 27, wherein the second optical element of the second optical group is made from sapphire.

* * * * *

UNITED STATES PATENT AND TRADEMARK OFFICE
CERTIFICATE OF CORRECTION

PATENT NO. : 8,462,439 B2  
APPLICATION NO. : 13/214968  
DATED : June 11, 2013  
INVENTOR(S) : Oskotsky et al.

Page 1 of 1

It is certified that error appears in the above-identified patent and that said Letters Patent is hereby corrected as shown below:

Title Page, Item (75) Inventors:

should read

(75) Inventors: Mark L. Oskotsky, Mamaroneck, NY (US); Michael J. Russo, Jr., Roslyn, NY (US); Gerard M. Perron, Acton, MA (US); David J. Korwan, Westford, MA (US)

Signed and Sealed this  
Twenty-second Day of September, 2015

Michelle K. Lee  
*Director of the United States Patent and Trademark Office*